United States Patent
Mao

(10) Patent No.: US 10,890,556 B2
(45) Date of Patent: Jan. 12, 2021

(54) ELECTROCHEMICAL DEPOSITION OF NANOWIRES ON NANOPARTICLES, LITHOGRAPHICAL PATTERNS AND ELECTRONIC DEVICES AND THEIR USE AS CHEMICAL SENSORS

(71) Applicant: Wayne State University, Detroit, MI (US)

(72) Inventor: Guangzhao Mao, Bloomfield Hills, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 120 days.

(21) Appl. No.: 15/807,726

(22) Filed: Nov. 9, 2017

(65) Prior Publication Data

US 2018/0128776 A1    May 10, 2018

Related U.S. Application Data

(60) Provisional application No. 62/419,521, filed on Nov. 9, 2016.

(51) Int. Cl.
| | | |
|---|---|---|
| *G01N 27/414* | (2006.01) | |
| *G01N 27/12* | (2006.01) | |
| *G01N 27/02* | (2006.01) | |

(52) U.S. Cl.
CPC ....... *G01N 27/4146* (2013.01); *G01N 27/127* (2013.01); *G01N 27/026* (2013.01)

(58) Field of Classification Search
CPC . G01N 27/4146; G01N 27/127; G01N 27/026
USPC ............................................................ 422/90
See application file for complete search history.

(56) References Cited

U.S. PATENT DOCUMENTS

| | | | |
|---|---|---|---|
| 7,709,054 B2 | 5/2010 | Mao et al. | |
| 8,206,824 B2 | 6/2012 | Mao et al. | |
| 2007/0284257 A1* | 12/2007 | Fukunaka | C25D 1/10 |
| | | | 205/239 |
| 2010/0224507 A1* | 9/2010 | Zamborini | G01N 27/127 |
| | | | 205/794.5 |
| 2010/0305499 A1* | 12/2010 | Matsiev | A61B 5/145 |
| | | | 604/67 |
| 2011/0089051 A1* | 4/2011 | Wang | B82Y 15/00 |
| | | | 205/781 |
| 2013/0337567 A1* | 12/2013 | Shin | G01N 27/4146 |
| | | | 436/63 |

OTHER PUBLICATIONS

Dunnill, C.W. (2010). "Superconducting tantalum disulfide nanotapes; growth, structure, and stoichiometry". Nanoscale. 2, 90-97. (Year: 2010).*

(Continued)

*Primary Examiner* — Matthew D Krcha
*Assistant Examiner* — Jacqueline Brazin
(74) *Attorney, Agent, or Firm* — Fishman Stewart PLLC

(57) ABSTRACT

Materials and methods for generating nanowires are described. Krogmann salt potassium tetracyanoplatinate sesquihydrate (K(def)TCP) nanowires are synthesized as interconnects on metal lithographic patterns in which the K(def)TCP nanowires grow across the metal lines. The chemical sensing capability of the K(def)TCP chips is demonstrated by impedance measurements.

18 Claims, 10 Drawing Sheets

(56) References Cited

OTHER PUBLICATIONS

Bera, J.K. (2002). "Chain Compounds Based on Transition Metal Backbones: New Life for an Old Topic". Angew. Chem Int Ed. 41: 23 4453-4457. (Year: 2002).*

Dickert, Franz L. et al., "Sensor Materials for Solvent Vapor Detection—Donor-Acceptor and Host-Guest Interactions," Advanced Materials, 1993, 5, No. 12, VCH Verlagsgesellschaft mbH, Weinheim, Germany, pp. 887-895.

Shimizu, Y. et al., "Theoretical Studies on the Impedance-Humidity Characteristics of Ceramic Humidity Sensors," Sensors and Actuators, 7 (1985), Elsevier Sequoia/Printed in The Netherlands, pp. 11-22.

Seiyama, T. et al., "Ceramic Humidity Sensors," Sensors and Actuators, 4 (1983), Elsevier Sequoia/Printed in The Netherlands, pp. 85-96.

Williams, Jack M. et al., "Structural Studies of Precursor and Partially Oxidized Conducting Complexes. 1. A Neutron Diffraction and Spectroscopic Investigation of Quasi-One-Dimensional Potassium Tetracyanoplatinate (1.75:1) Sesquihydrate, K1.75[Pt (CN)4] 1.5H2O1," Inorganic Chemistry, vol. 15, No. 10, 1976, Contribution from the Chemistry Division, Argonne National Laboratory, Argonne, Illinois, pp. 2446-2455.

Wagner, H. et al., "Optical Conductivity and Electron Interaction in the One-Dimensional Metal K2Pt(Cn)4 Br0.3 3H2O," Solid State Communications, vol. 13, No. 6, 1973, Pergamon Press, Printed in Great Britain, pp. 659-663.

Geserich, H.P. et al., "Optical Investigations on the Metallic Behaviour of K2Pt(Cn)4Cl0.3 2.6 H2O and K2PT(CN) 4Br0.3 2.6 H2O Single Crystals," phys. stat. sol. (a) 9, 187 (1972), Institut für angewandte Physik. Universität Karlsruhe, Sonderforschungsbereich 66 (a), and Institute für anorganische Chemie, Universität Karlsruhe (b), pp. 187-190.

Andrei Kolmakov, Youxiang Zhang, et al., "Detection of CO and $O_2$ Using Tin Oxide Nanowire Sensors", Advanced Materials 2003, 15, No. 12 Jun. 17, pp. 997-1000.

Zhiyong Fan, Johnny C. Ho, et al, "Toward the Development of Printable Nanowire Electronics and Sensors", Advanced Materials, 2009, 21, pp. 3730-3743.

Yun-Ze Long, Miao Yu et al., "Recent advances in large-scale assembly of semiconducting inorganic nanowires and nanofibers for electronics, sensors and photovoltaics", Journal Chem. Soc. Rev., 2012, 41, pp. 4560-4580.

Yi Cui, Qingqiao Wei et al., "Nanowire Nanosensors for Highly Sensitive and Selective Detection of Biological and Chemical Species", Science vol. 293 Aug. 17, 2001, pp. 1289-1292.

Eyal Capua, Roberto Cao et al., "Detection of triacetone triperoxide (TATP) with an array of sensors based on non-specific interactions", Sensors and Actuators B 140 (2009) pp. 122-127.

Bin Wang, John C. Cancilla et al., "Artificial Sensing Intelligence with Silicon Nanowires for Ultraselective Detection in the Gas Phase", Nano Letters, 2014 American Chemical Society, pp. 933-938.

Edward Song, Jin-Woo Choi et al., "Multi-analyte detection of chemical species using a conducting polymer nanowire-based sensor array platform", Sensors and Actuators B 215 (2015) pp. 99-106.

Shabnam Virji, Jiaxing Huang, et al., "Polyaniline Nanofiber Gas Sensors: Examination of Response Mechanisms", Nano Letters 2004 vol. 4, No. 3 pp. 491-496.

Sandra C. Hernandez, Debangshu Chaudhuri, et al., "Single Polypyrrole Nanowire Ammonia Gas Sensor", Electroanalysis 19, 2007, No. 19-20, pp. 2125-2130.

Pin Ann Lin, Dong Liang, et al., "Shape-Controlled Au Particles for InAs Nanowire Growth", Nano Letters 2012, 12, pp. 315-320.

Daisuke Ito, Michael L. Jespersen, et al., "Selective Growth of Vertical ZnO Nanowire Arrays Using Chemically Anchored Gold Nanoparticles", AcsNano, vol. 2 No. 10, pp. 2001-2006 (2008).

Allon I. Hochbaum, Rong Fan, et al. "Controlled Growth of Si Nanowire Arrays for Device Integration", Nano Letters 2005, vol. 5, No. 3, pp. 457-460.

R.S. Wagner, W.C. Ellis, "Vapor-Liquid_Solid Mechanism of Single Crystal Growth", Applied Physics Letters, vol. 4, No. 5, pp. 89-90, Mar. 1, 1964.

Alfredo M. Morales, Charles M. Lieber, "A Laser Ablation Method for the Synthesis of Crystalline Semiconductor Nanowires", Science vol. 279, Jan. 9, 1998, pp. 208-211.

Fudong Wang, Angang Dong, et al., "Solution-Liquid-Solid Growth of Semiconductor Nanowires", Inorganic Chemistry, vol. 45, No. 19, 2006, pp. 7511-7521.

Dongzhong Chen, Ruomiao Wang, et al., "Particle-Rod Hybrids: Growth of Arachidic Acid Molecular Rods from Capped Cadmium selenide Nanoparticles", J. Am. Chem. Soc, 2004, vol. 126, No. 50, pp. 16290-16291.

Sunzi Wang, Li Li, et al., "Formation of Carboxylic Acid Nanorods on Oleylamide-Capped Au Nanoparticles", The Journal of Physical Chemistry C, 2012, 116, pp. 5492-5498.

Ruomiao Wang, Li Li, et al., "Nanoparticles Change the Ordering Pattern of n-Carboxylic Acids into Nanorods on HOPG", AcsNano, 2010, vol. 4, No. 11, pp. 6687-6696.

Li Li, Pedram Jahanian, et al., "Electrocrystallization of Tetrathiafulvalene Charge-Transfer Salt Nanorods on Gold Nanoparticle Seeds", The Journal of Physical Chemistry C, 2014, 118, pp. 18771-18782.

K. Krogmann, "Planar Complexes Containing Metal-Metal Bonds", Angew. Chem. Internat. Edit., vol. 8 (1969), No. 1, pp. 35-42.

Carrie E. Buss, Kent R. Mann, "Synthesis and Characterization of $Pt(Cn-p-(C_2H_5)C_6H_4)_2(Cn)_2$, a Crystalline Vapoluminescent Compound That Detects Vapor-Phase Aromatic Hydrocarbon", Journal American Chem. Soc., vol. 124, No. 6, 2002, pp. 1031-1039.

D. Kuse, H.R. Zeller, "Evidence for One-Dimensional Metallic Behavior in $K_2Pt(Cn_4Br_{o.3}(H_2O)n$", Physical Review Letters, vol. 27, No. 16, Oct. 18, 1971, pp. 1060-1063.

R. Comes, M. Lambert, et al., "Evidence for a Peierls Distortion or a Kohn Anomaly in One-Dimensional Conductors of the Type $K_2Pt(CN_4Br_{o.3}xH_2O$", Physical Review B, vol. 6, No. 2, Jul. 15, 1973.

B. Renker, H. Rietschel, et al., "Observation of Giant Kohn Anomaly in the One-Dimensional Conductor $K_2Pt(Cn)_4Br_{0.3}$ $3H_2O$", Physical Review Letters, vol. 30, No. 22, May 28, 1973, pp. 1144-1147.

Joel S. Miller, "Electrochemical Growth of Highly Conducting Inorganic Complexes", Science 194 (4261), 189.

Keith D. Keefer, Donald M. Washecheck, et al., "A novel Quasi-One Dimensional Zig-Zag Platinum Atom Chain in $K_{1.75}Pt(Cn))_4$ $1.5H_2$ O.A Neutron Diffraction Study", Journal of the American Chemical Society, 98:1, Jan. 7, 1976, pp. 233-234.

Ronald L. Musselman, Jack M. Williams, "Polarized Specular Reflectance of the New One-dimensional 'Metals' $K_{1.75}[Pt(Cn)_4]$ $1.5H_2O$, $Rb_{1.75}[Pt(Cn)_4]$ $1.5H_2O$, and $Cs_{1.75}[Pt(Cn)_4]$ $1.5H_2O$", J.C.S. Chem. Comm., 1977, pp. 186-188.

Lei Wan, Devika S. Manickam, et al., "DNA Release Dynamics from Reducible Polyplexes by AFM", Langmuir. Author manuscript; available in PMC Feb. 19, 2010, pp. 1-21.

Duward F. Shriver, "Inorganic Syntheses", vol. XIX, Published by John Wiley & Sons, Inc., 1979.

Wilhelm Melitz, Jian Shen, et al., "Kelvin probe force microscopy and its application", Surface Science Reports 66 (2011) pp. 1-27.

Helga Sorribas, Celestino Padeste, et al., "Photolithographic generation of protein micropatterns for neuron culture applications", Biomaterials 23 (2002), pp. 893-900.

Ting Zhang, Megan B. Nix, et al., "Electrochemically Funtionalized Single-Walled Carbon Nanotube Gas Sensor", Electroanalysis 18, 2006, No. 12, pp. 1153-1158.

E. McCafferty, V. Pravdic, et al., "Dielectric Behaviour of Adsorbed Water Films on the $\alpha$-$Fe_2O_3$ Surface", Journal Department of Chemistry, Center for Surface and Coatings Research, Lehigh University, Sep. 25, 1969, pp. 1720-1731.

Robert W. J. Scott, San Ming Yang, et al., "Tin Dioxide Opals and Inverted Opals: Near-Ideal Microstructures for Gas Sensors", Advanced Materials 2001, 13, No. 19, Oct. 2, pp. 1468-1472.

* cited by examiner

☐ Selectivity

☐ Sensitivity

☐ Reliability

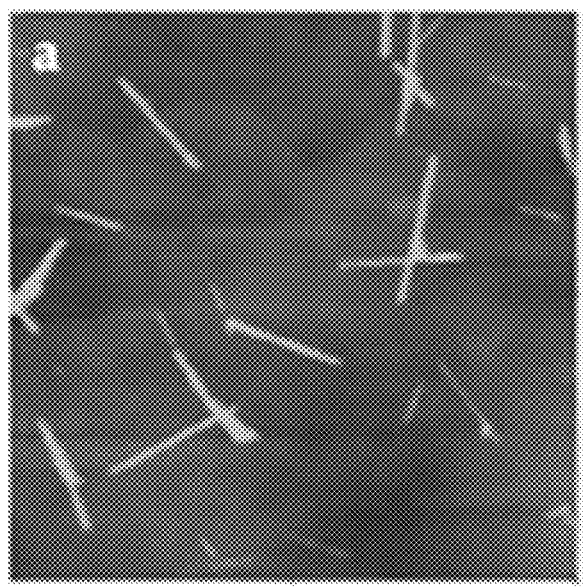 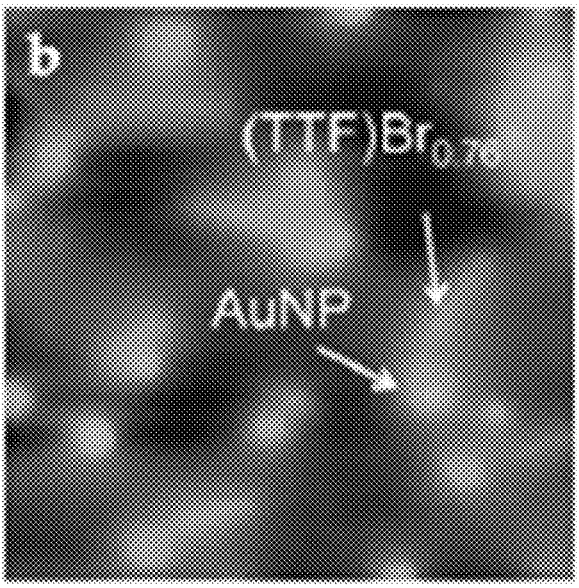
FIG. 7A  FIG. 7B
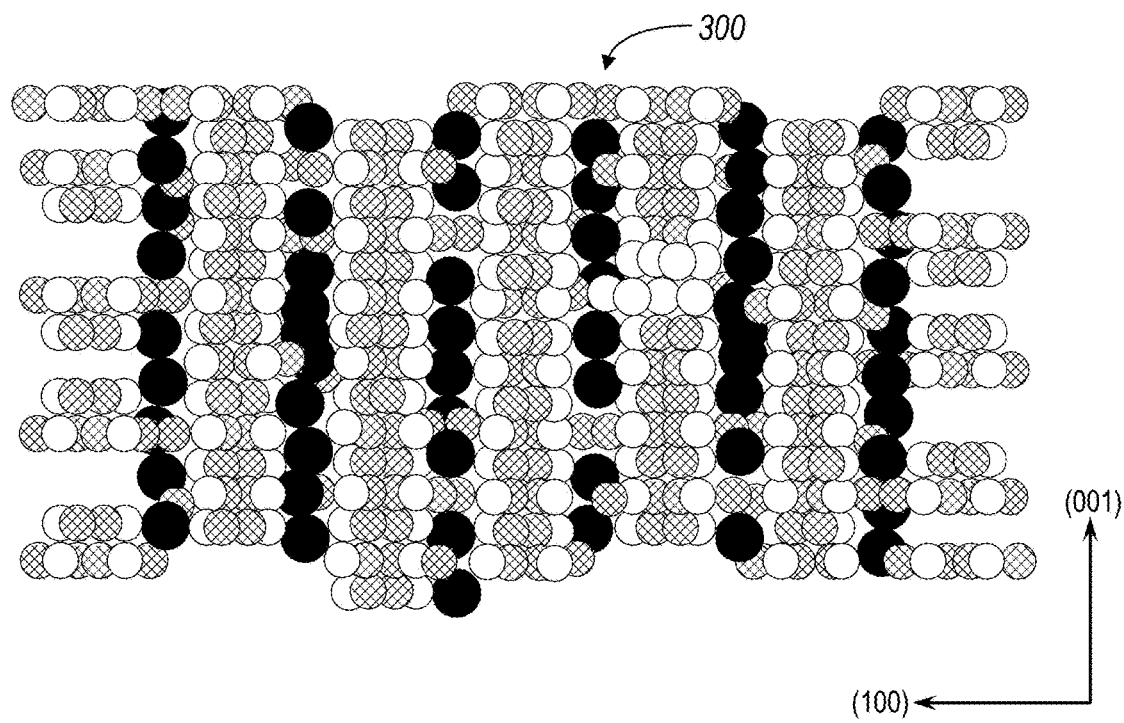
FIG. 7C

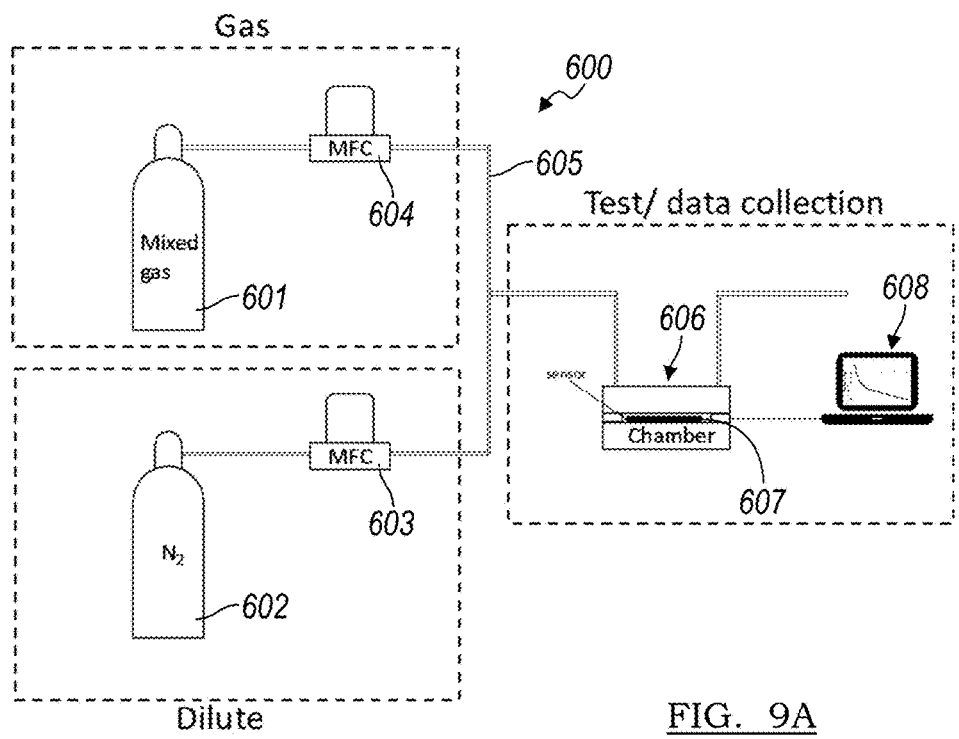
FIG. 9A
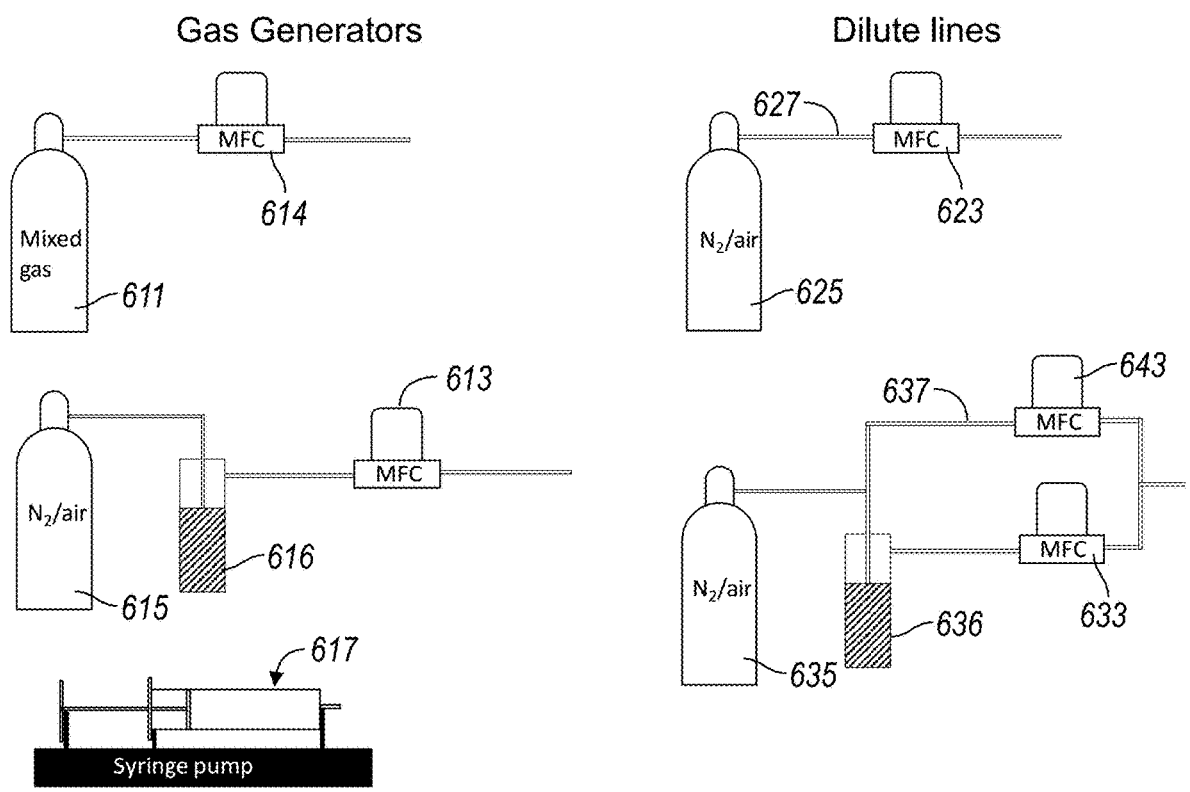
FIG. 9B
FIG. 9C

ELECTROCHEMICAL DEPOSITION OF NANOWIRES ON NANOPARTICLES, LITHOGRAPHICAL PATTERNS AND ELECTRONIC DEVICES AND THEIR USE AS CHEMICAL SENSORS

CROSS-REFERENCE TO RELATED APPLICATION

This application claims priority to U.S. Provisional Patent Application S/N 62/419,521, filed on Nov. 9, 2016, which is hereby incorporated by reference in its entirety.

STATEMENT REGARDING FEDERALLY SPONSORED RESEARCH OR DEVELOPMENT

This invention was made with government support under Award Numbers CHE1404285 and IIP1500253, awarded by the National Science Foundation. The government has certain rights in the invention.

BACKGROUND

The present application generally relates to compositions of matter pertaining to conductive organic nanowires, methods for synthesizing the same, and devices that make use of such nanowires.

Nanowires have been applied to sensing for over 10 years but very few nanowire sensors have reached the market. The major barriers are the complexity of manufacturing and difficulty in manipulating and connecting nanowires in devices. Additionally, there is a need to invest a relatively high amount of capital to create environments in which nanowires can be synthesized; for instance, cleanrooms are used, which can be costly to set up. Conditions of high pressure and high temperature are also employed in conventional generation of nanowires. The workflow for synthesizing nanowires. Finally, the assembly process requires a high degree of nanoscale precision.

Seed-mediated mechanisms have been used to synthesize nanowires. A commonly used method is the vapor-liquid-solid (VLS) mechanism based on the eutectic reaction of a vapor source with a metallic seed particle such as the gold nanoparticle (AuNP). A variation of the VLS is the solution-liquid-solid (SLS) mechanism in which a metallo-organic precursor solution provides the source for the nanowire synthesis. In both cases, the metallic seed particle is in the liquid state and catalyzes nanowire growth in part by acting as a crystallization solvent.

The current technologies for gas detection are optical, electromagnetic, and electrochemical methods using metal oxide semiconductors, silicon, and carbon nanotubes (CNTs). Traditional metal oxide sensors do not perform well against the next generation of nanosensors in key metrics (sensitivity, selectivity, response time, energy consumption, and device size) and have reached their research and development limit. The dominant nanosensor materials, silicon nanowires and CNT technology, perform better in the above metrics but they have failed to reach the chemical/environmental safety market due to the cost and complexity of nanosensor manufacturing.

It has been a challenge to develop a lower cost, simple process for generating nanowires, and for creating devices that incorporate nanowires.

SUMMARY

In one aspect, the present disclosure provides a composition of matter including a nanowire, such as a nanowire made at least in part from a tetrathiafulvalene (TTF) charge-transfer salt, such as TTF bromide (TTFBr), or a Krogmann salt.

In another aspect, the present disclosure provides a method of making a nanowire or a nanowire composition. The method may include deposition of a solution droplet on a precursor surface, such as a chip or a micro-fabricated device. The method by be a room temperature fabrication process.

In a further aspect, the present disclosure provides a device including a nanowire. In some embodiments, the device may be a sensor. In some embodiments, the sensor may be a vapor sensor.

Further objects, features and advantages of this system will become readily apparent to persons skilled in the art after a review of the following description, with reference to the drawings and claims that are appended to and form a part of this specification.

BRIEF DESCRIPTION OF THE DRAWINGS

FIGS. 7A and 7B are AFM images of $(TTF)Br_{0.76}$ crystals resulting from an electrochemical crystallization process;

FIG. 7C is a schematic view of $(TTF)Br_{0.76}$ crystals resulting from an electrochemical crystallization process;

FIGS. 9A, 9B, and 9C are schematic views of testing apparatus for sensors as described in the present disclosure.

DETAILED DESCRIPTION

Figure 1A:
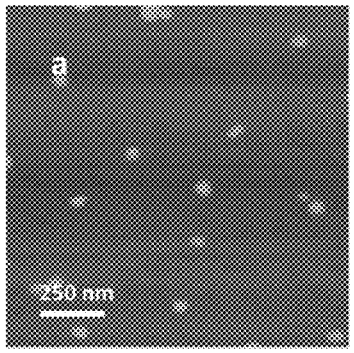
FIGS. 1A, 1B, 1C, 1D, 1E, 1F, 1G, and 1H are atomic force microscopy (AFM) images of nanowires of the present disclosure.

The terms "substantially" or "about" used herein with reference to a quantity includes variations in the recited quantity that are equivalent to the quantity recited, such as an amount that is equivalent to the quantity recited for an intended purpose or function. "Substantially" or derivatives thereof will be understood to mean significantly or in large part.

Disclosed herein is a seed-mediated method to nucleate 1-D nanostructures, which refer to materials with 2 of the 3 dimensions in the nanoscale size range, roughly 1-100 nm of organic compounds bearing morphological resemblance to those produced by vapor-liquid solid (VLS) or solution-liquid-sold (SLS) methodologies, but is attributed to a completely different mechanism. This work is similar to, but an advance beyond, the inventor's previous work, which is disclosed in U.S. Pat. No. 7,709,054, issued on May 4, 2010, and in U.S. Pat. No. 8,206,824, issued on Jun. 26, 2012, both of which are incorporated herein by reference in their entireties.

In one method of the present disclosure, a solid surface, such as a nanoparticle or a lithographic pattern, acts as a nucleation seed for molecular crystallization, and the highly curved nanoparticle surface directly contributes to the 1-D nanostructures. The seed-mediated concept may be applied in the electrocrystallization of tetrathiafulvalene (TTF) charge-transfer salt nanowires on the AuNP seeds.

As described herein, a nanowire may be made of an organic conductor, which is defined as a material capable of conducting electricity and which includes at least one of carbon and sulfur. In some embodiments, the organic conductor includes one of carbon and sulfur, and at least one other element. In some embodiments, as will be described below, the organic conductor may form a nanowire in a solution-based, room-temperature electrocrystallization process.

As described herein, a nanowire may be made of an organic semiconductor, which is defined as a material which acts as a semiconductor and which includes at least one of carbon and sulfur. In some embodiments, the organic semiconductor includes one of carbon and sulfur, and at least one other element. In some embodiments, as will be described below, the organic semiconductor may form a nanowire in a solution-based, room-temperature electrocrystallization process.

The disclosures of this application demonstrate the synthesis of a new type of nanowires from the Krogmann salt family, the electrochemical deposition of the Krogmann salt on lithographically patterned chips, and the use of the Krogmann salt chips for vapor sensing. Disclosed herein is a potential solution to overcome a major barrier in nanosensor manufacturing—the difficulty in manipulating and connecting nanowires in devices.

Disclosed herein is a process to place nanowires directly and precisely on micro-fabricated chips and microelectronic devices. This is accomplished by nucleating nanowires using patterns on the substrate as nucleation sites. Since the nanowire originates from specific substrate sites such sites control the placement of the nanowires. The present disclosure also provides for chemical sensor devices based on this process. This process or method is a one-step fabrication technique to create nanowires and nanowire-based chemical sensor devices using controllable growth of seed-mediated organic nanocrystal wires directly on micro-fabricated substrates. The approach as described herein places crystalline nanowires directly on micropatterns and electronic devices as interconnects using a solution-based, room-temperature electrocrystallization process. The nanowires generated are in electrical connection with an electrode from which they extend.

Electrocrystallization not only enables direct synthesis of nanomaterials on microelectronic substrates but also produces higher quality crystals than chemical synthesis in general. The present disclosure provides a potential solution to overcome a major barrier in nanosensor manufacturing—the difficulty in manipulating and connecting nanowires in devices.

The type of organic nanowires may initially be synthesized from the family of partially oxidized tetracyanoplatinates, also called the Krogmann salts, specifically K(def)TCP. Krogmann salts are 1-D conducting materials formed by oxidation of crystalline Pt(II) complexes. Initial experiments focus on the cation deficient Krogmann salt, potassium tetracyanoplatinate sesquihydrate ($K_{1.75}Pt(CN)_4 \cdot 1.5H_2O$ or K(def)TCP). K(def)TCP crystals are synthesized on chromium and gold (Cr/Au) electrode patterns by electrochemical reduction of $K_2Pt(CN)_4$ using 0.3 M $K_2Pt(CN)_4$, 1.5 V applied over potential, and 300 sec reaction time. A Cr/Au electrode pattern may be deposited by standard photolithography. Chemical sensing measurements on the nanowire device were conducted using an electrochemical impedance workstation in a gas chamber when vapors of water, methanol, ethanol, isopropanol, dichloromethane, and hexane, among others, are introduced. The K(def)TCP crystals show higher sensitivity to polar solvents with little or no impedance change when they are exposed to nonpolar solvents such as hexane and dichloromethane. The K(def)TCP nanowire resistance measured in $N_2$ is in the range of $5 \times 10^6$ ohms ($\Omega$). The nanowire resistivity value is within the range reported of the conductivity of bulk K(def)TCP crystals. To demonstrate the sensitivity of K(def)TCP conductivity, water vapor concentration was varied in the range of 0.002-0.011 v/v by controlling the volumetric flow rates of saturated water vapor and $N_2$.

Impedance results of K(def)TCP exposed to a variety of volatile chemical compounds (water, aliphatic alcohols, hexane, etc.) indicate physical interactions of the gaseous molecules with the K(def)TCP crystal to be the primary mechanism for the modification of its resistance.

Using this process, a nanowire sensor using the organic conductor K(def)TCP may be directly deposited as a nanowire on the electrode substrate using electrochemical crystallization from an aqueous solution has been achieved. This invention can be used widely to deposit a variety of nanocrystal materials as nanowires onto lithographical patterns and electronic substrates to facilitate integration and manufacturing of nanosensors, nanosensor arrays and other nanodevices The family of partially oxidized tetracyanoplatinates, also called the Krogmann salts, is formed by oxidation of crystalline Pt(II) complexes. Krogmann salts were intensively studied from 1960 to 1980 and have gained renewed interest for nanotechnology. The most common Krogmann salt, potassium tetracyanoplatinate bromide trihydrate ($K_2[Pt(CN)_4]Br_{0.3} \cdot 3H_2O$ or KCP(Br)), is an anion deficient Krogmann salt. KCP(Br) possesses near metallic conductivity due to the short Pt—Pt separation, which allows electron delocalization along the overlapping $dz^2$ orbitals. Another anion-deficient Krogmann salt suitable for use in the nanowires of the present device is potassium tetracyanoplatinate chloride trihydrate ($K_2[Pt(CN)_4]Cl_{0.3} \cdot 3H_2O$ or KCP(Cl)). Cation-deficient Krogmann salt, potassium tetracyanoplatinate sesquihydrate ($K_{1.75}Pt(CN)_4 \cdot 1.5H_2O$ or K(def)TCP), may be used in such an application. Alternatively, cesium tetracyanoplatinate monohydrate ($Cs_2Pt(CN)_4 \cdot H_2O$), or rubidium tetracyanoplatinate dihydrate ($Rb_{1.6}Pt(CN)$ $_4$.2H$_2$O) may be employed. In another embodiment, guanidinium tetracyanoplatinate hydrate ((C(NH$_2$)$_3$)$_2$Pt(CN)$_4$.H$_2$O) may be used to create the structures of the present application. The conductive nature of K(def)TCP enables its synthesis via electrochemistry. The crystal structure and conductivity K(def)TCP have been determined. The room temperature conductivity of K(def)TCP, 70-100 Ω$^{-1}$ cm$^{-1}$, while primarily dependent on the Pt—Pt separation distance, may also be influenced by the crystalline environment including ligands, cations, and lattice water molecules. This structural sensitivity may make K(def)TCP a good sensor material.

The principles of the present disclosure may also be applied to other organic conductors. These conductors include, but are not limited to, early transition metal complexes, including but not limited to tantalum disulfide (TaS$_2$); organic charge-transfer complexes; and partially oxidized transition metal complexes, including but not limited to hydrates (including trihydrates) of potassium tetracyanoplatinate halides (K$_2$[Pt(CN)$_4$]X$_{0.3}$.3H$_2$O, wherein X is a halogen such as chlorine or bromine), or oxaloplatinates, such as potassium bis(oxalato)platinate (II) (2:1) dihydrate, K$_2$Pt(C$_2$O$_4$)$_2$.2H$_2$O and potassium bis(oxalato)platinate (1.64:1) dihydrate, K$_{1.64}$Pt(C$_2$O$_4$)$_2$.2H$_2$O. It is envisioned that any conductive organic compound that can be synthesized by electrocrystallization can be employed.

Certain organic charge transfer salts that may be useful in the applications described in the present disclosure include salts of a variety of fulvalenes, including TTF, bis(ethylenedithio)tetrathifulvalene (BEDT-TTF), and tetramethyltetraselenafulvalene (TMTSF). Each of the proceeding may be an electron donor of a salt, and may be paired with an electron acceptor, including bromide ion, iodide ion, hexafluorophosphate (PF$_6^-$), tetrafluoroborate (BE$_4^-$), perchlorate anion (ClO$_4^-$), and tetracyanoquinodimethane (TCNQ). These electron acceptors can be matched with donors in any suitable way.

Nanowires may be the next generation building block for ultrasensitive and ultrafast chemical detection. Nanowires may be integrated into sensor arrays capable of detecting volatile organic compounds (VOCs) at low levels and high selectivity for applications including chemical process control, environmental monitoring, heating/ventilation/air conditioning (HVAC) applications, personal safety, and antiterrorism. Despite the research progress very few nanowire sensors have reached the market. The major barriers may be the complexity of manufacturing and difficulty in manipulating and connecting nanowires in devices. Nano-sized interconnects, for example, carbon nanotubes (CNTs), must be placed individually on chips, a process that makes mass production difficult.

There is also a need to develop new chemically sensitive materials as sensor materials. Majorities of nanowire sensing materials being developed are inorganic, but organic materials may offer advantages in chemical specificities, tunable conductivities, processing, and cost. Candidate organic materials for nanowire sensing include conducting polymers. By this method it is possible to synthesize K(def)TCP nanowires directly on lithographic electrode patterns as interconnects using a solution-based, room-temperature electrocrystallization process. Electrocrystallization not only enables direct synthesis of nanomaterials on chips but also produces higher quality crystals in general than chemical synthesis.

First, the K(def)TCP nanowires were grown on gold nanoparticle (AuNP) seeds via electrocrystallization. The AuNP seeds were deposited on highly oriented pyrolytic graphite (HOPG) electrodes. The AuNPs were deposited by electrochemical reduction of hydrogen tetrachloroaurate (HAuCl$_4$) on the working electrode HOPG (Equation 1):

$$AuCl_4^- + 3e^- \rightarrow Au(0) + 4Cl^- (E_{Au(III)/Au(0)}^0 = 0.761 \text{ V}). \quad \text{(eqn. 1)}$$

The concentration of HAuCl$_4$ was varied from 0.05 to 10 mM with 0.1 mM KCl supporting electrolyte. It was found that the AuNP morphology was primarily controlled by the HAuCl$_4$ concentration. The size of the AuNPs increases with increasing HAuCl$_4$ concentration (FIG. 1A-D). The AuNP shape changes from hemi-spherical at below 1 mM HAuCl$_4$ to dendritic shape when the HAuCl$_4$ concentration is above 1 mM. The AuNPs were electrochemically deposited on HOPG in different HAuCl$_4$ concentrations: 0.01 mM (FIG. 1A), 0.1 mM (FIG. 1B), 1 mM (FIG. 1C), and 5 mM (FIG. 1D). The applied overpotential was fixed at −0.5 V and deposition time was fixed at 0.01 second.

Electrocrystallization of K(def)TCP was carried out on the anode HOPG upon the application of a potential pulse of 1.5 V (vs. standard calomel electrode (SCE)) for 0.1 s in 0.07 M of K$_2$Pt(CN)$_4$ in deionized water in order to partially oxidize Pt$^{2+}$ to Pt$^{2.25+}$ (Equation 2):

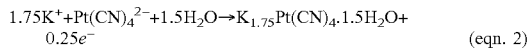
$$1.75K^+ + Pt(CN)_4^{2-} + 1.5H_2O \rightarrow K_{1.75}Pt(CN)_4 \cdot 1.5H_2O + 0.25e^- \quad \text{(eqn. 2)}$$

The Pt$^0$/Pt(CN)$_4^{2-}$ oxidation potential is 0.59 V (vs. SCE). H$_2$ was produced at the platinum wire cathode. A silver wire was used as the pseudo-reference electrode.

Figure 1E:
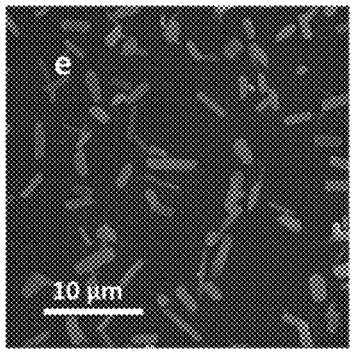
Figure 1I:
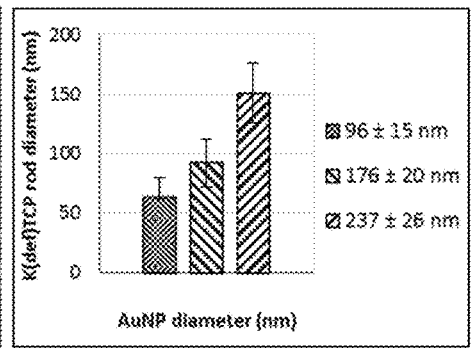
FIG. 1I is a graphical representation of the properties of a nanowire of one of FIGS. 1A-1H.
Figure 1B:
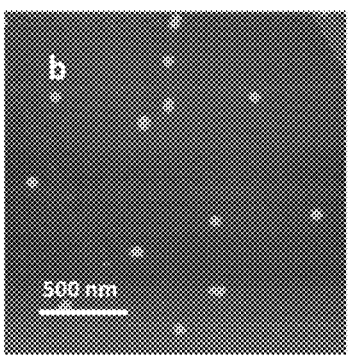
Figure 1F:
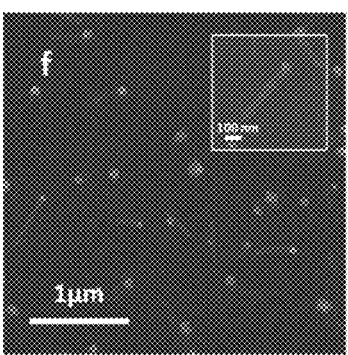
Figure 1J:
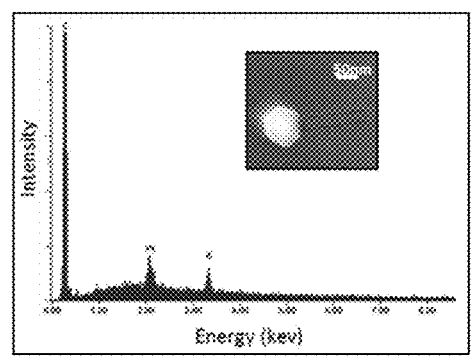
FIG. 1J is a graphical representation of the properties of a nanowire of one of FIGS. 1A-1H and an AFM image inset.
Figure 1C:
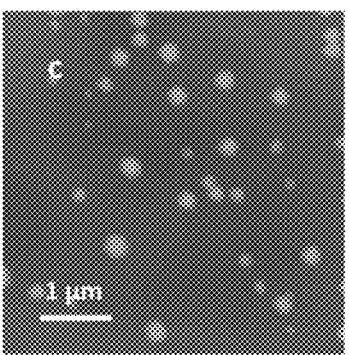
Figure 1G:
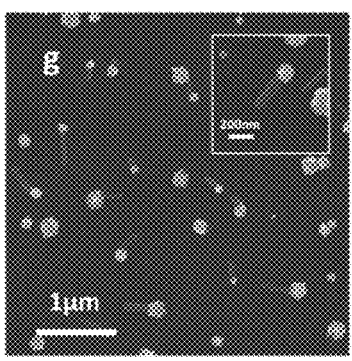

In the absence of the AuNPs, elongated thin plate-like crystals with a size range of 0.6-5 μm in length and 0.1-0.5 μm in width were synthesized on the HOPG (FIG. 1E). The average aspect ratio of the K(def)TCP microcrystals is 3.2±0.9, in the range of reported bulk values, 2.4-4. The K(def)TCP crystals grown on the AuNP-decorated HOPG anode are shown in FIG. 1F-H as a function of the AuNP particle size. The field-emission scanning electron microscopy (FE SEM) images clearly show the preferential nucleation of K(def)TCP on the AuNP seeds. Roughly 75% of the K(def)TCP nanocrystals were directly attached to the AuNPs.

The electrocrystallization process was also studied by real-time atomic force microscopy (AFM) and using an electrochemical fluid cell consisting of a standard three-electrode system: HOPG as the working electrode, silver wire as the pseudo-reference electrode, and platinum wire as the counter electrode. FIG. 1H shows an AFM image of K(def)TCP being nucleated on the AuNP-decorated HOPG electrode in the aqueous solution of 0.07 M K$_2$[Pt(CN)$_4$]. Using AFM sectional height analysis it was determined that the AuNP height and diameter were 82±23 nm and 336±35 nm, respectively, while the average K(def)TCP nanocrystal height, width, and length were 39±4 nm, 80±15 nm, and 370±51 nm, respectively. The lateral sizes were determined by the lateral distances at the half maximum height of the object in order to minimize AFM tip convolution. It is not surprising that the AFM size of the K(def)TCP crystals is smaller than the FE SEM size because AFM captured the beginning stage of K(def)TCP crystallization in solution. FIG. 1I plots the size histogram of the AuNP diameter and the attached K(def)TCP width. While there is no significant change in the crystal aspect ratio (2.9-4.2), the size of the K(def)TCP crystals is significantly reduced by its nucleation on the AuNPs. The average K(def)TCP width is 151±25 nm when the AuNP diameter is 237±26 nm. The average K(def)TCP width is 92±20 nm when the AuNP diameter is 176±20 nm. The K(def)TCP width is 63±16 nm when the AuNP diameter is 96±15 nm. The dimensional correlation between the AuNP and the attached K(def)TCP can be seen in the inset images of FIG. 1F-G. A majority (~67%) of K(def)TCP nanocrystals are oriented with their rod axis perpendicular to the seed/crystal interface. This suggests a preferential molecular attachment or nucleation direction of the crystal on the AuNP seed.

The chemical composition of the K(def)TCP crystals grown on the AuNPs was studied by EDS attached to the FE SEM. Both K and Pt were detected on the K(def)TCP nanocrystals (FIG. 1J). The measured K/Pt molar ratio, 1.84, is close to the theoretical value of K(def)TCP.

The crystal structure of K(def)TCP was determined using single crystal neutron diffraction by Williams et al. of a triclinic crystal structure with the following unit cell lattice parameters: a=10.36 Å, b=11.83 Å, c=9.30 Å, $\alpha$=102.4 Å, $\beta$=106.4 Å, $\gamma$=114.7 Å, $V_c$=918.3 Å$^3$, and Pt to Pt separation of 2.96 Å (see Keefer et al., A novel quasi-one-dimensional zig-zag platinum atom chain in K1.75Pt(CN)4 1.5H2O. A neutron diffraction study. *J. Am. Chem. Soc.* 1976:98(1): 233-234, and Williams et al., Structural studies of precursor and partially oxidized conducting complexes. A neutron diffraction and spectroscopic investigation of quasi-one-dimensional potassium tetracyanoplatinate (1.75:1) sesquihydrate. *Inorg. Chem.* 1976: 15(10):2446-2455.)

Figure 1K:
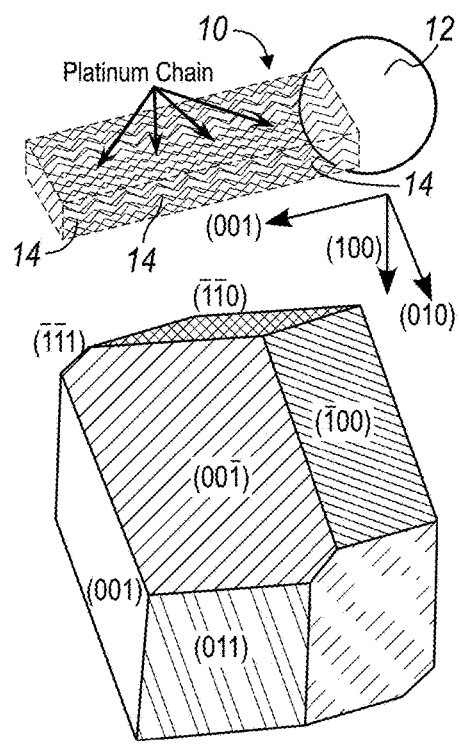
FIG. 1K is schematic images of nanowires of the present disclosure.
Figure 1D:
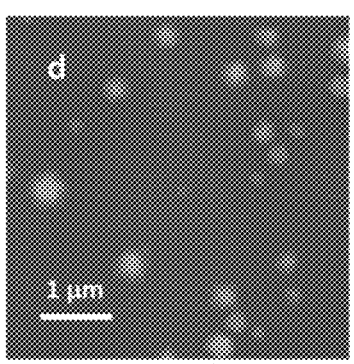
Figure 1H:
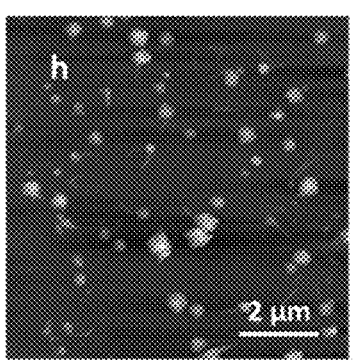

FIG. 1K illustrates the orientation of the K(def)TCP nanocrystal 14 with respect to the AuNP seed 12 with the long axis (the c axis) in the radial direction perpendicular to the K(def)TCP/AuNP interface. The Pt—Pt chain extends along the c axis. FIG. 1K shows the simulated morphology of the K(def)TCP crystal and various prominent crystal faces (see Supporting Information for the percentage of various faces).

Figure 2A:
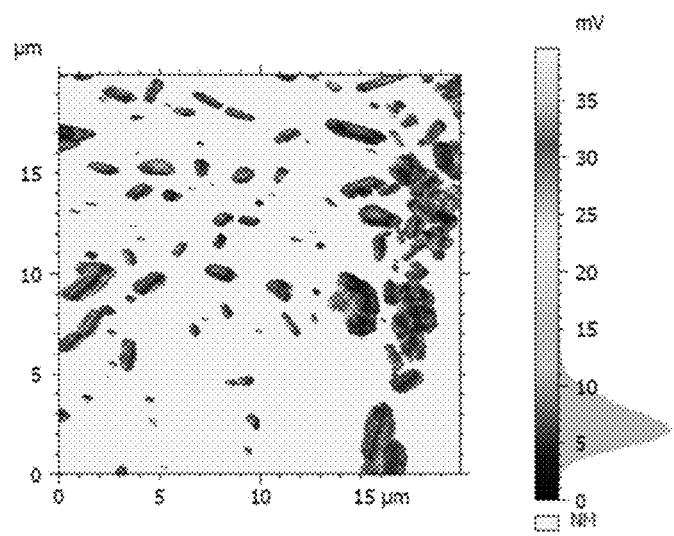
FIG. 2A is a photograph and capacitance gradiet of nanocrystals formed in accordance with the present disclosure.
Figure 2B:
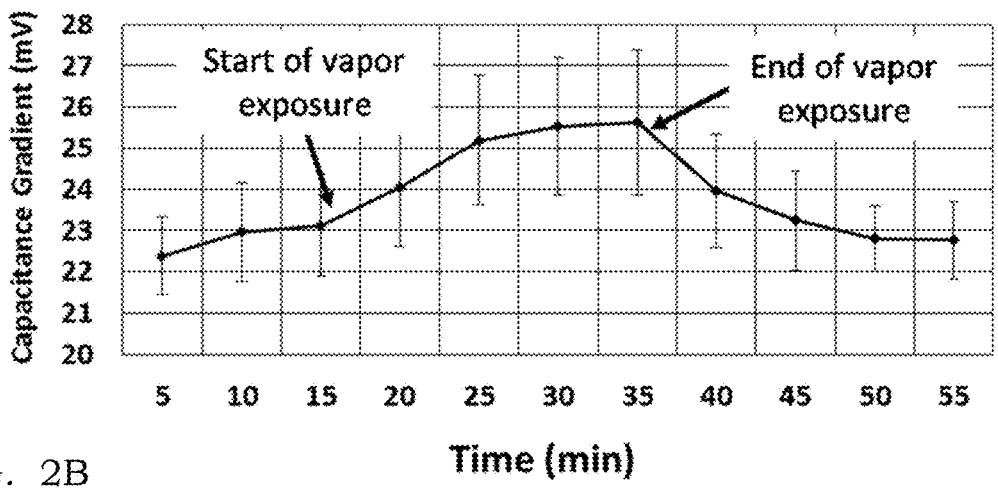
FIGS. 2B and 2C are graphical representations of the properties of nanowires of the present disclosure.
Figure 2C:
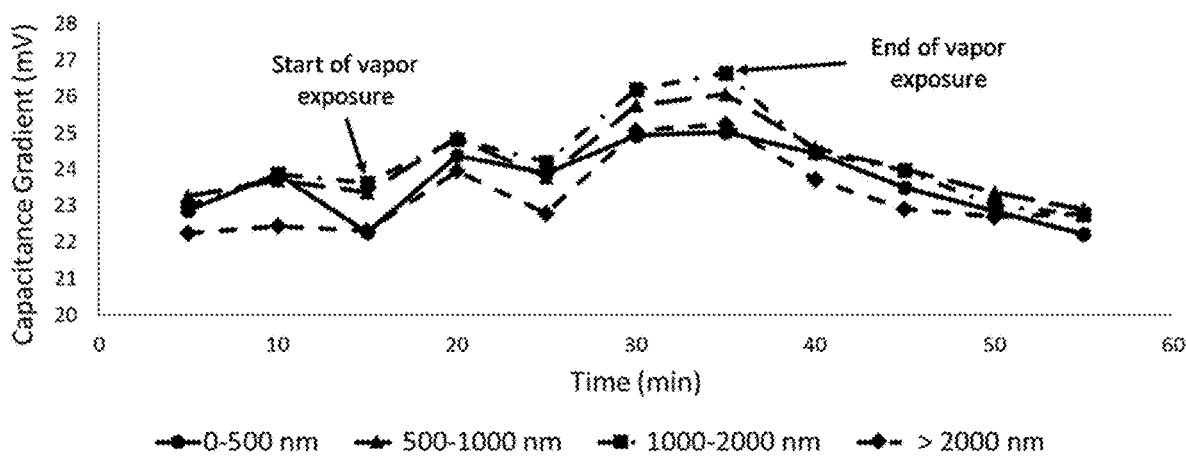

Kelvin Probe Force Microscopy (KPFM) may be used to study the electrical behavior of the K(def)TCP nanocrystals in the presence of water vapor. KPFM is a tool to measure the contact potential difference between a conducting AFM probe and the sample surface, $V_{CPD}$, by applying an alternating current to generate oscillating electrical forces plus a direct current to nullify the oscillating electrical forces. $V_{CPD}$ is related to the semiconductor sample surface potential. FIG. 2A shows the capacitance gradient on the K(def)TCP nanocrystals to be uniform regardless of their size and shape. The uniform potential indicates uniform chemical composition of the K(def)TCP nanocrystals. FIG. 2B shows the average CPD change of K(def)TCP crystals when exposed to water vapor. The data show that K(def)TCP surface potential increases upon exposure to water vapor and that the effect is reversible after purging with $N_2$. The same trend was observed for different sizes of K(def)TCP nanocrystals with length range from 100 nanometers (nm) to >2,000 nm (FIG. 2C). The KPFM measurements show that individual K(def)TCP nanocrystals change their capacitance when exposed to water vapor.

Figure 3A:
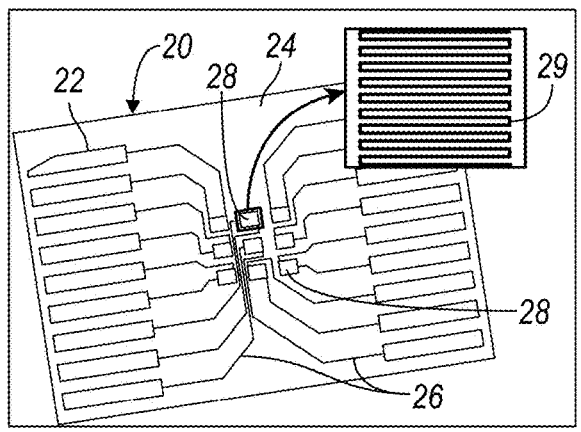
FIG. 3A is a schematic view of nanowires grown on a substrate.
Figure 3B:
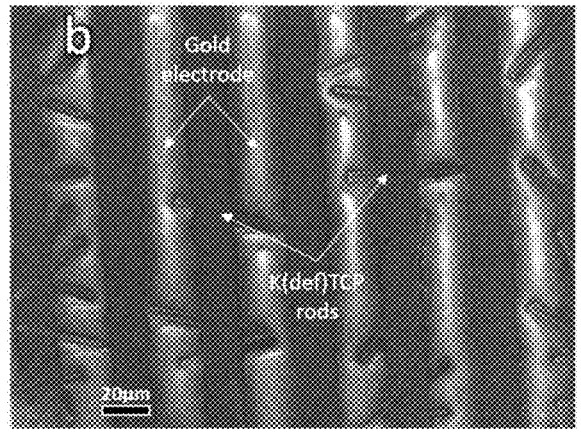
FIG. 3B is a photographic view of nanowires grown on a substrate.

Electrocrystallization of K(def)TCP can be used to make interconnects on chips for chemical sensing. K(def)TCP nanocrystals were synthesized on Cr/Au electrode patterns by electrochemical reduction of $K_2Pt(CN)_4$ following eqn. 2 using 0.3 M $K_2Pt(CN)_4$, 1.5 V applied overpotential, and 300 seconds reaction time. The Cr/Au electrode pattern was deposited by standard photolithography to form a chip 20. FIG. 3A shows an electrode pattern featuring a plurality of contact pads 22 and working electrode arrays 28, with an interconnect 26 connecting each contact pad 22 to a working electrode array 28. The working electrode array 28 includes a Cr/Au comb-like interdigitated pattern of electrode lines 29, which may have spacing of about 10, 20, and 30 µm, printed on a glass plate 24. FIG. 3B shows an SEM image of K(def)TCP nanowires electrochemically deposited across the Cr/Au lines as interconnects for impedance measurements in the presence of various vapors. Standard photolithography may be used to deposit such metal lines, including Cr/Au patterns, which may function as the site of nucleation (in contrast to, for example, discrete nanoparticles.) Other metals may be used as electrode materials, including but not limited to silver, copper, platinum, and other metals and alloys.

Figure 3C:
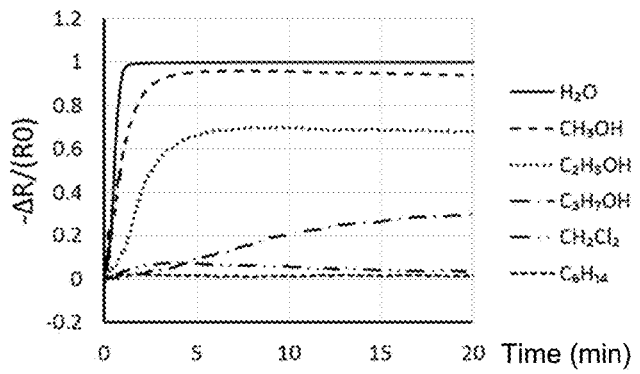
FIGS. 3C, 3D, and 3E are graphical views of the performance of nanonwires of the present disclosure.
Figure 3D:
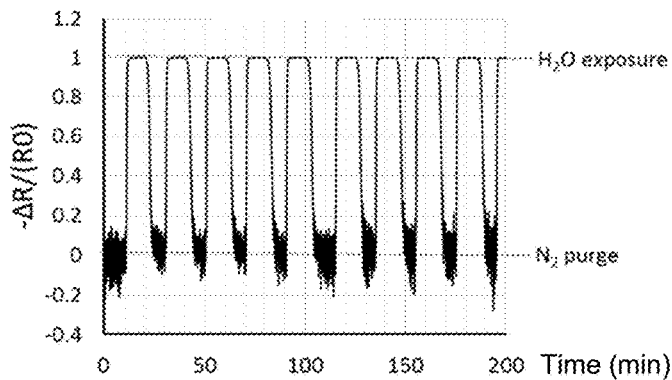
Figure 3E:
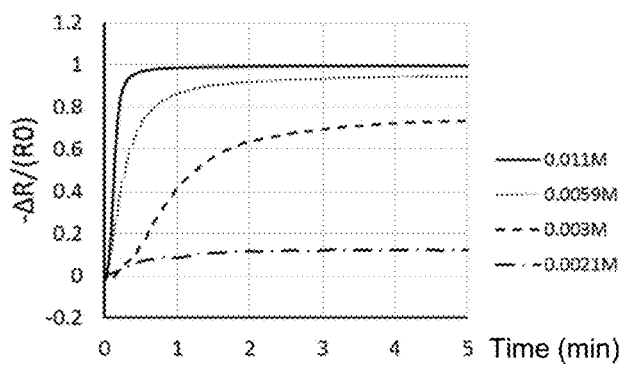

Chemical sensing measurements on the chip 20 were conducted using an electrochemical impedance workstation in a home-built vapor chamber. The chamber was purged with $N_2$ prior to the introduction of each chemical vapor. The change in impedance, which is a complex function of resistance and reactance, with time was measured with zero bias and an oscillating voltage of amplitude 0.2 V at 1 kHz. FIG. 3C shows the impedance change as a function of exposure time for different vapors. The K(def)TCP resistance measured in $N_2$ is in the range of $5\times10^6\Omega$, which yields a conductivity value of 100 $\Omega^{-1}$ cm$^{-1}$. The K(def)TCP sensor shows higher sensitivity to polar solvents while little or no impedance change when they are exposed to nonpolar solvents. The reliability of the K(def)TCP sensor was assessed by repeated measurements in water vapor (FIG. 3D). The relative standard deviation was 0.034% (n=10). When stored in typical laboratory atmosphere at 23° C. for more than one week, the response current of the K(def)TCP sensor remained unchanged. To demonstrate the sensitivity of K(def)TCP conductivity, water vapor concentration was varied in the range of 0.002-0.011 v/v by controlling the volumetric flow rates of saturated water vapor and $N_2$. FIG. 3E shows the impendence change decreasing with decreasing water concentration.

Figure 4A:
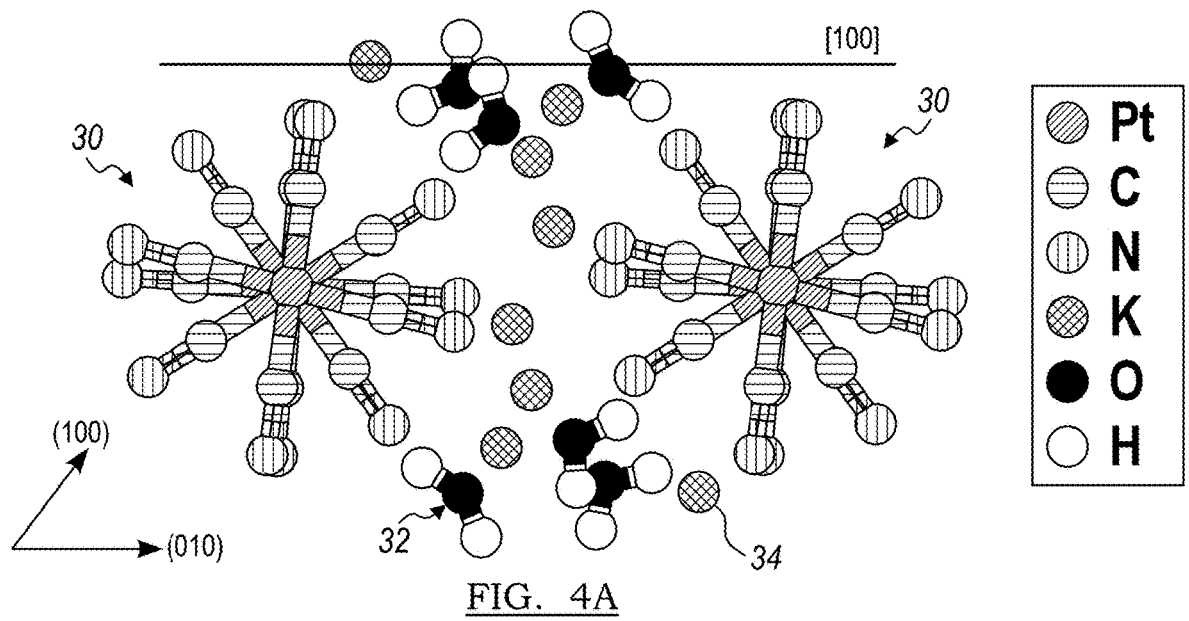
FIGS. 4A, 4B, and 4C are schematic representations of an adsorption reaction.

Without wishing to be bound by any theory, structural analysis suggests a possible water molecular interaction with the K(def)TCP crystal. The present data show a different behavior than reported in the literature. FIG. 2e shows that the K(def)TCP sensor becomes saturated when the concentration exceeds 0.01 M. In contrast, gas sensors tend to display the Brunauer, Emmett, and Teller (BET) adsorption behavior in which the surface conductivity increases exponentially with the gas concentration. The present results suggest a different mechanism. FIG. 4A shows the surface view of a crystal cleaved along the (100) face as viewed along the [001] direction. It shows that the K(def)TCP 30 crystal surface is rich in water molecules 32.

Figure 4B:
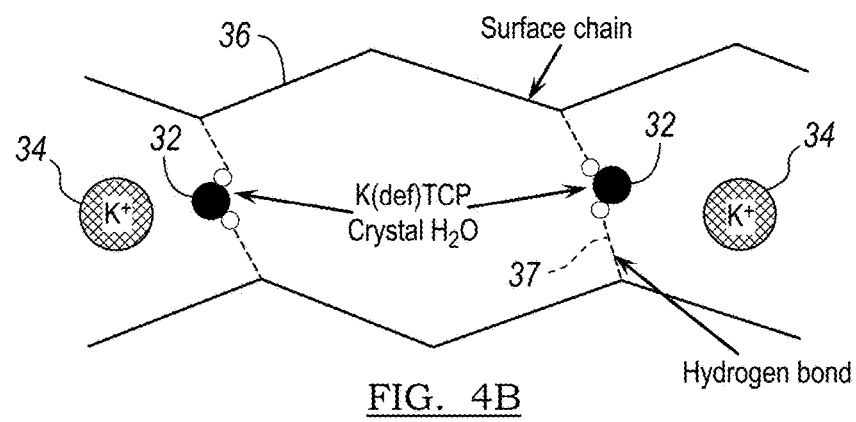

K(def)TCP has a high conductivity in the direction of the Pt chain (the c axis) due to the short Pt—Pt separation allowing for considerable $dz^2$ overlapping. The conductivity of K(def)TCP primarily depends on the Pt—Pt separation distance but also is influenced by the crystalline environment of the Pt chain. The planar $[Pt(CN)_4]^{-1.75}$ group stacks along the c axis and is stabilized by the ionic bond between $K^+$ and $CN^-$ and the H-bond between $CN^-$ and $H_2O$. The zigzag distribution of the H-bond 37 between $CN^-$ and $H_2O$ may cause the zigzag Pt chain configuration 36 (FIG. 4B). The H-bond 37 changes the $[Pt(CN)_4]^{-1.75}$ torsion angle, which further increases the Pt—Pt separation distance.

Figure 4C:
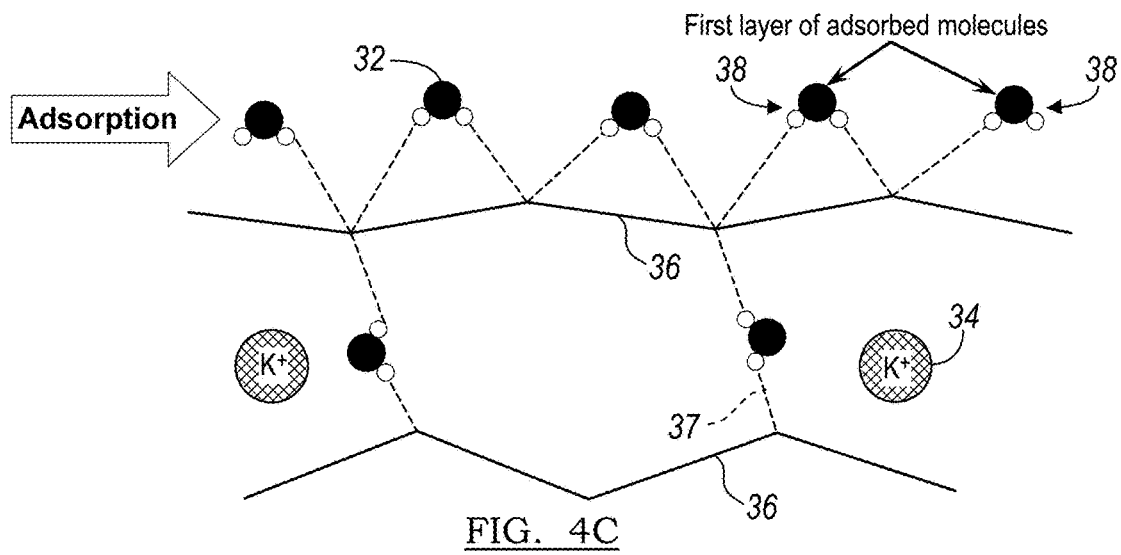

Without wishing to be bound by any particular theory, water vapor adsorption may result in an attractive force among Pt chains 36 near the surface 38 to reduce the distortion of the Pt chain and Pt—Pt separation distance (FIG. 4C). This results in an overall increase in the K(def)TCP nanowire surface conductivity. This is also consistent with the observation that the sensor reaches a saturation point because this effect is only restricted to the surface water layer. The outer layers of the adsorbed molecules will have a much weaker interaction with the crystal surface structure.

In summary, the present disclosure represents the first Krogmann salt nanosensor in which an organic conductor, K(def)TCP, was directly deposited on the electrode substrate using electrocrystallization from an aqueous solution. Herein is demonstrated a strategy of seed-mediated growth of organic nanowires using nanoparticles as nucleation seeds. The present disclosure provides for a way to deposit nanocrystals on lithographical patterns, potentially utilizing the geometry of the pattern itself for crystallization, that could ultimately facilitate integration and manufacturing of nanosensors, nanosensor arrays, and other nanodevices.

Figure 5A:
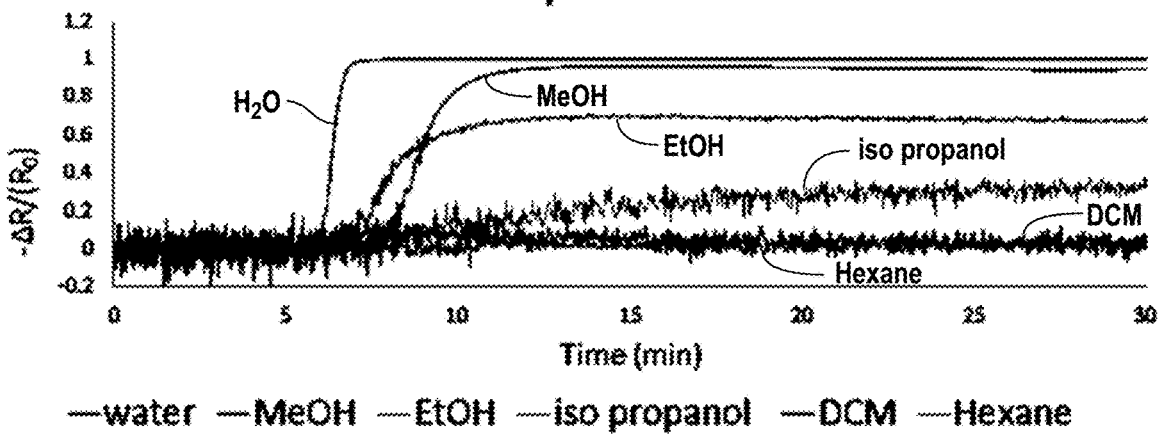
FIGS. 5A, 5B, and 5C are graphs showing performance of a device containing a sensor based on a nanowire.
Figure 5B:
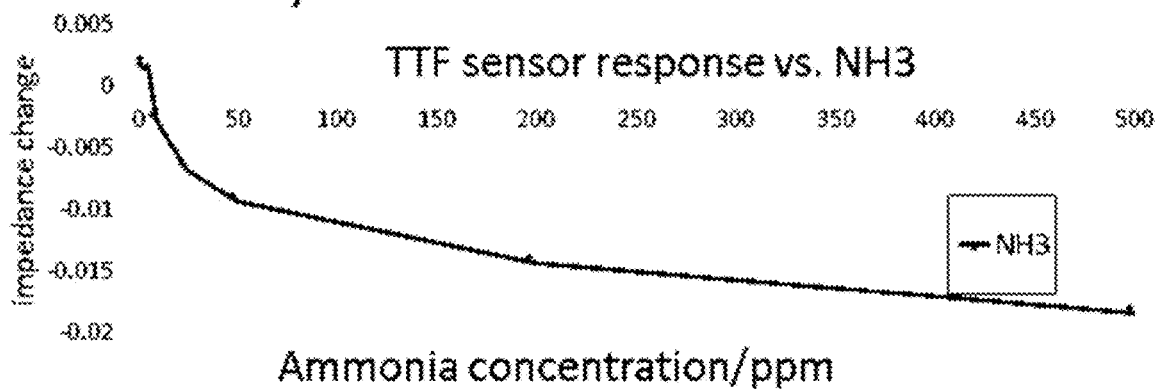
Figure 5C:
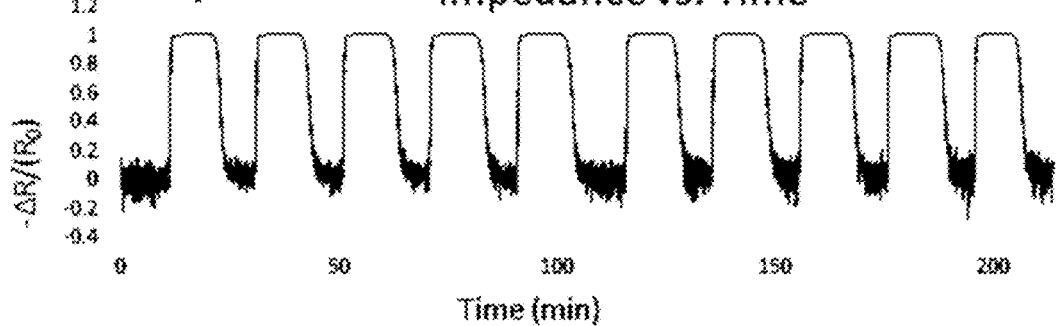

The above-mentioned nanowire deposition and synthesis methods can be used to create a sensor. The performance parameters of a sensor containing a nanowire component in accordance with the principles of the present disclosure are shown in FIG. 5. FIG. 5A demonstrates the impedance vs. time of the sensor when exposed to water, methanol, ethanol, isopropanol, dichloromethane, and hexane. In other embodiments, further gases, such as hydrogen sulfide or acetone, may also be tested. FIG. 5B shows the sensitivity of a TTF sensor in response to varying amounts of ammonia. Finally, FIG. 5C shows the reliability of a sensor which is used over a course about 200 minutes.

Compared with existing nanowire sensor fabrication methods, the present disclosure provides the following attributes: direct deposit of a solution droplet, nanowires are created right on chips or microfabricated devices; it is a room temperature fabrication process, thus enabling less complex and capital-intensive manufacturing process; it is a modular method that enables combinatory synthesis of a wide range of new organic nanowires; and it is a fabrication technology compatible with flexible electronics platforms. In certain embodiments, the process may be a reversible process allowing for portable and reusable products. The nanowire sensors are made by electrodeposition on nanopatterns, which may be related to a nanoconfinement effect on electrocrystallization.

Figure 6A:
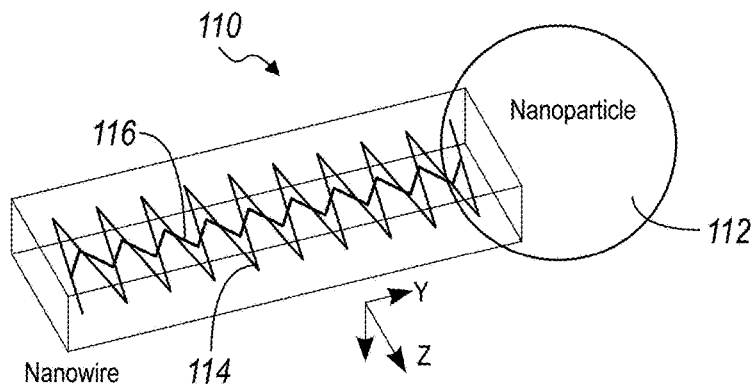
FIG. 6A is a schematic view of a nascent nanowire.
Figure 6B:
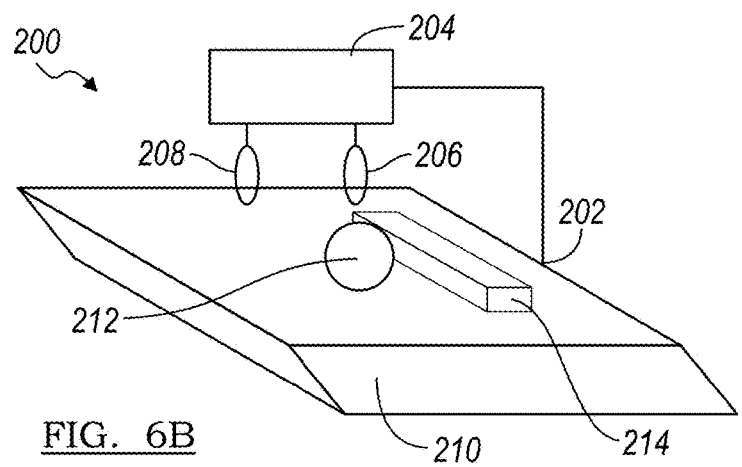
FIG. 6B is a schematic view of a nascent nanowire in a circuit.
Figure 6C:
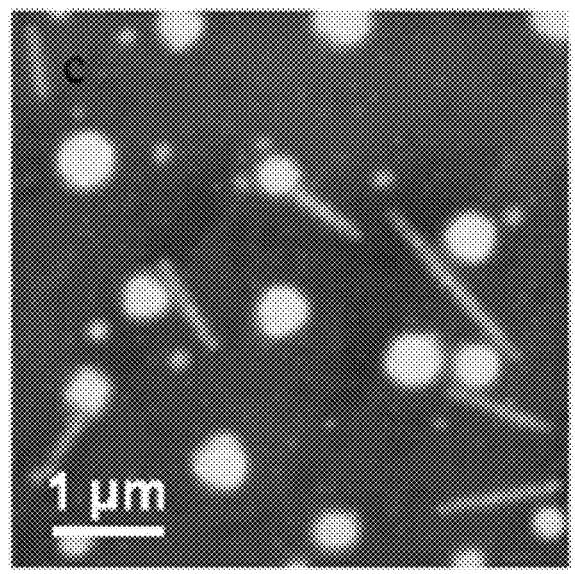
FIG. 6C is an AFM image of a nascent nanowire.

This approach is a solution-based, room-temperature process that facilitates scalable manufacturing directly on large-area microelectronic circuitry. The impact of a nanoconfinement effect, without wishing to be bound by any theory, may be seen in FIG. 6. Nanowire 116 formation may be attributed to the nanoconfinement effect imposed by the nanoparticle seed 112 (FIG. 6A). The high curvature of a nanoparticle seed 112 imposes unsustainable strain energy on the nucleated crystal 114 at the crystal/seed interface and results in a nanowire crystal with constrained cross-sectional area. Control over nanowire width is possible by modulating nanoparticle diameter and may apply to different nanoparticles and organic crystalline compounds. The nanoconfinement concept has been successfully applied to the synthesis of tetrathiafulvalene (TTF) charge-transfer salt nanowires (FIGS. 6B-6C). An experimental setup 200 is shown in FIG. 6B, in which the TTF nanowire 214 extends from gold nanoparticle 212, these being disposed on a HOPG base 210. Potentiostat 204 measures the potential across the circuit using counter electrode 208, reference electrode 206, and working electrode 202.

Numerous applications can be impacted by the nanowires of this disclosure. For instance, sub-part per million (PPM) detection levels may be possible in a sensor containing these nanowires. "Internet of Things" applications involving small, low cost, low power, multi-gas sensors may also be enabled. The broader impacts of this nanosensor technology are already evident in the aforementioned projects we are tracking: improved disease detection and mitigation, better food safety, and enhanced antiterrorism capabilities. Other examples of potential impacts include higher crop yields (nanoscale sensors for earlier detection of pathogens), better protection for emergency responders and industrial plant workers, and continued U.S. technology leadership in high tech applications and profitable, high-growth markets.

Existing sensors in the market today tend to underperform on one or more of these metrics, despite ongoing incremental improvements in readout time, miniaturization, and cost. At a minimum, nanosensors promise to deliver greater sensitivity, much faster readout times, and far smaller form factors, ideally at or below current costs. Many applications also call for the detection of multiple chemical species, placing nanosensor innovations at a distinct advantage because they allow for numerous sensors within a single, multi-agent detector device. Contrarily, the organic electrochemical nanosensor technique of the present disclosure delivers very well against all of these metrics.

Nanomaterials are useful as electrochemical transducers because they exhibit a high specific surface area, increasing their contact with chemical analyte(s) for a given mass of material, and improving sensitivity of the sensor. In addition to the inherent advantages of the nanowires as signal transducers, the technology of the present disclosure has several other advantages over competing technologies: 1) making nanowires directly on the micro-fabricated device by combining the bottom-up and top-down approaches to nano-manufacturing, 2) offering a low cost room temperature process as opposed to high-temperature high-vacuum processes of making Si- and C-based nanowires, 3) modular approach enabling combinatory synthesis of a wide range of organic and polymeric nanofibers not limited to Si and C, and 4) manufacture of organic nanowires suitable for flexible electronics and sensors.

Furthermore, this method is capable of making nanowire transducers at the time of use by adding a droplet containing the active ingredients. This method allows repeated making and unmaking of the transducer component. In making the nanowire, an electrical pulse is applied to the micro-electrode immersed in the active crystallizing droplet. After its use, the nanowires can be removed by a reverse pulse or by immersing the microelectrode in a solvent to remove the nanowires. We envision that the cycle can be repeated multiple times without significant reduction of the sensor performance. This is a very unique feature of the approach disclosed herein.

One-dimensional (1D) nanostructures such as nanowires have potential applications as spacers, interconnects, and functional units in nanoscale electronic, optoelectronic, electrochemical, and electromechanical devices. A majority of current 1D nanomaterials are inorganic in nature, but organic nanomaterials can be both complementary and even competitive to their inorganic counterparts. Organic functional nanomaterials are attractive because they are easily processable, flexible, energy friendly, inexpensive, and compatible with downscaling towards nanodevices.

Connecting nanoparticles with size-dependent properties and nanowires with unidirectional transport properties can be achieved by placing interconnects, for example, carbon nanotubes, on prearranged metal contact nanopatterns, a slow process. Alternatively, one can design individual nano-objects consisting of discrete nanoparticle cores and nanorod branches and devise further strategies to pattern these nano-objects. To that end, inorganic architectures, for example, multipods, nanodendrites, and higher-order geometries, have been synthesized. In these examples, both seeds and nuclei consist of similar inorganic building blocks through epitaxy mechanisms. On the other hand, when organics are interfaced with inorganic nanocrystals, they are usually deposited as shells and not as branches with separate geometry.

This disclosure provides evidence of the capability of micro- and nano-electrodes in reducing crystal size of organic conductors down to the nanometer size. It further provides a one-step synthesis method of charge-transfer nanowires by electrocrystallization that may overcome the inherent physical limitations of these materials and enable their integration into microelectronic circuitry. Electrocrystallization is used to synthesize molecular conductors of high purity. Electrocrystallization offers a much better control of the crystallization conditions than evaporation driven crystallization. In electrocrystallization, the primary driving force is the applied overpotential η, which can be precisely controlled with a potentiostat. η is defined as the electrochemical potential difference between the applied potential and the standard redox couple potential. The seed-mediated method to connect nanowires and nanoparticles belonging to different material groups promises a room temperature, solution based process to generate nanowires from diverse crystalline compounds. The technology of the present disclosure will allow supramolecular structures and functions of small molecules to be utilized in nanotechnology applications.

The present disclosure is based on the seed-mediated nucleation principle of organic crystals by nanoparticle seeds. Seed-mediated nucleation promotes heterogeneous nucleation. Despite its wide industrial use, the effect of seed size has yet to be understood, particularly when the seed size approaches the critical nucleus dimension. The seed size requirement for heterogeneous seed-mediated nucleation remains unknown. A key parameter for the formation of a hybrid nanostructure triggered by a dissimilar seed according to the classical nucleation theory is the dimensionless seed size. $R'=R^S/rc^2$. $R^S$ the radius of curvature of the seed particle. $r_c$ is the critical nucleus size.

The present disclosure shows the unique capability of certain nanoparticles to nucleate nanocrystals of extremely small cross-sectional area of n-carboxylic acids.1 The presence of mercaptoundecanoic acid-capped cadmium selenide (MUA-CdSe) nanoparticles was found to alter the self-assembled pattern of eicosanoic acid on highly oriented pyrolytic graphite (HOPG) from a 2D epitaxial film to 1D nanowires attached to the nanoparticles. A comprehensive follow-up study of a homologous n-carboxylic acid series found that several of them also form nanowires readily on nanoparticles of different core materials (CdSe, CdS, and Au). The core chemical composition of the seed maybe immaterial to the nanowire formation in certain embodiments. The chemical composition of the capping monolayer of the seed, however, plays a role in nanowire formation. Comparing nucleation capability of a methyl-terminated nanoparticle, oleylamide-capped AuNPs (OA-AuNPs), whose interaction with the crystallizing unit is limited to the dispersive interaction with that of the carboxyl-terminated nanoparticle MUA-AuNPs it was found that dispersive interactions alone can support the seed-mediated mechanism of nanowire formation. However, specific interactions aid in maintaining an intact nanoparticle/nanowire interface.

The present disclosure reveals that AuNP seed size range in which the incipient phase, n-carboxylic acids, can display a different morphology from its unconstrained bulk phase. The results show a competition between the nanoparticle and the HOPG substrates for carboxylic acid crystal nucleation. At low chemical potential driving force, the nucleation rate is dominated by the epitaxial interaction between the carbon chain plane and the basal plane of the HOPG, which lowers the nucleation energy. In the competition between HOPG- and nanoparticle-mediated molecular ordering, longer carbon chain length on the part of the n-carboxylic acid favors the epitaxial interaction with the HOPG because it increases with increasing chain length. Experimental observation of nanoparticle-induced nanowire formation is consistent with the molecular simulation results of colloidal crystallization that identify a critical seed size. Below the critical nucleus size 1D structures are induced by the high curvature of the small seed, which imposes an unsustainable strain for tangential crystal growth.

Figure 8A:
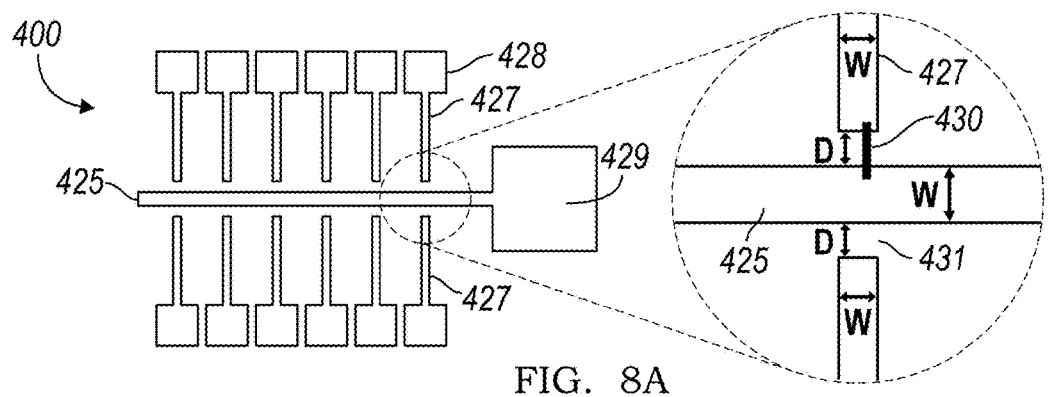
FIGS. 8A, 8B, and 8C are schematic views of a microelectrode.
Figure 8B:
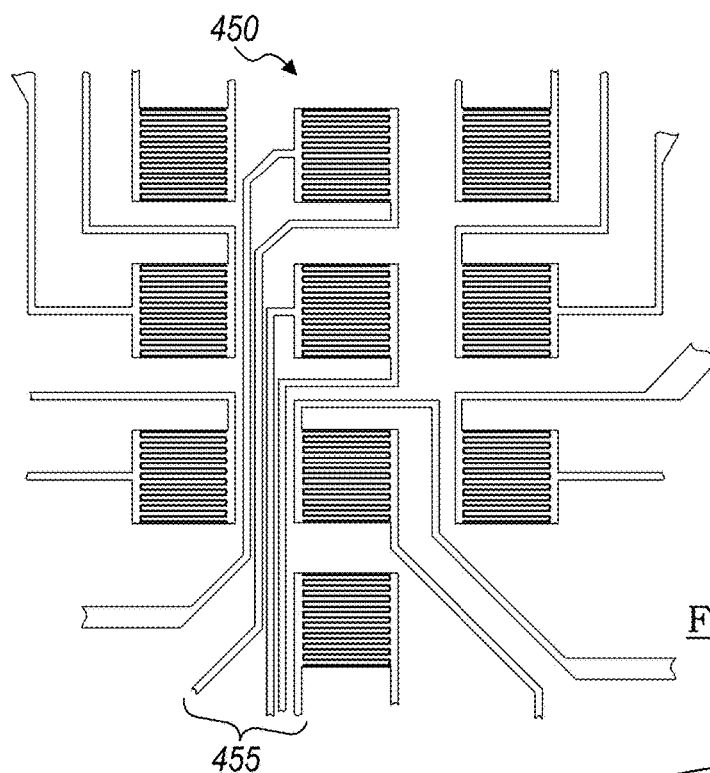

More recently the nanoconfinement effect in electrocrystallization has been studied. Both the nanoparticle seed, AuNP, and the nucleated nanowire, $(TTF)Br_{0.76}$, were deposited electrochemically on a HOPG electrode. Electrodeposition of the AuNP seeds on HOPG shows controllable morphology by changing electrolyte concentration and overpotential. HOPG shows an increased electrochemical activity upon AuNP deposition supporting the use of AuNPs as nucleation seeds. $(TTF)Br_{0.76}$ electrocrystallization was conducted using a 4 second (s) potential pulse of 0.5 V (vs. SCE) as a function of TTF concentration on the HOPG in the absence and presence of electrodeposited AuNPs. It has been found that 5 mM TTF is appropriate for TTF nucleation on AuNPs. In the absence of AuNPs, $(TTF)Br_{0.76}$ crystals grow to 3-13 μm in length and 250-800 nm in width (FIG. 8A). Using EDS attached to the field-emission SEM we have confirmed the expected S/Br ratio of the $(TTF)Br_{0.76}$. In the presence of 20 nm AuNPs, $(TTF)Br_{0.76}$ preferentially nucleates on the AuNP, consistent with the higher activities of the AuNP. AuNP-mediated $(TTF)Br_{0.76}$ crystals are much smaller in size, 24-40 nm in width and 100-500 nm in length (FIG. 8B). To our best knowledge, there are no other methods that can produce TTF crystals of this small size. FIG. 7C shows the (TTF)I0.71 crystal structure 300 using the XRD data from the Cambridge Crystallographic Database and Accelrys Materials Studio. The crystal structure possesses P21/a monoclinic unit cell symmetry with the following lattice parameters: a=48.015 Å, b=16.041 Å, c=24.877 Å, and ——=91.310°.—The [001] direction is the stacking direction as well as the charge transfer direction. Without wishing to be bound by any theory, the low-energy face should parallel the HOPG basal plane with the needle axis being the [001] direction. The nanowire width/height variation is proportional and therefore controllable by the diameter of the AuNP seed.

The nanowire transducer component of the electrochemical sensor demonstrates functional nanowire transducer and transducer/electrical contact interface.

Electrical impedance response of the nanowire transducer may be tested to varying concentrations of vapors of interest, in one example, by manufacturing TTF and tetracyanoplatinate nanowires using seed-mediated electrocrystallization on Cr/Au patterns. The Cr/Au electrode patterns will have tapered edges to act as nucleation and crystallization-constraining points for nanowire growth demonstrating that such nanowires can reliably and reproducibly be fabricated on commercial substrates and the nanowires can function as transducers on the commercial substrates for the detection of vapors of interest.

TTF salts exhibit many desirable properties for nanodevices including air stability (no degradation under ambient conditions for decades), metallic color, high purity, and high mobility. Tetracyanoplatinate salts and oligothiophenes may also be employed.

The conductivity of the nanowires cannot be easily measured by traditional conductivity measurement devices because of their small size. Kelvin force microscopy, part of the AFM setup, can be used to test the nanowire conductivity. Kelvin force microscopy measures the contact potential difference between an AFM probe and the sample and has been used to measure the conductivity in individual Si nanowires. Nanowires deposited on silicon wafer are indeed conductive and their conductivity changes when exposed to vapors. The contact potential of TTF and tetracyanoplatinate salt nanowires deposited on silicon wafers and their electrical potential variation can also be observed.

Figure 8C:
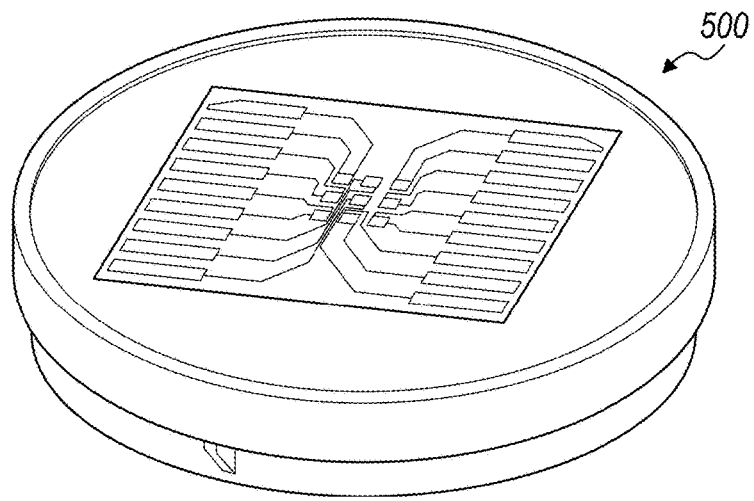
Figure 10A:
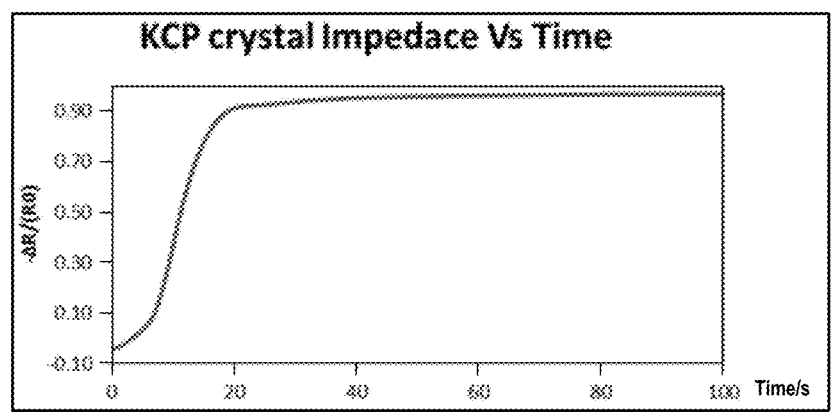
FIGS. 10A, 10B, 10C, and 10D illustrate KCP crystal impedance versus time measured in the context of a device including a nanowire according to the present disclosure.
Figure 10B:
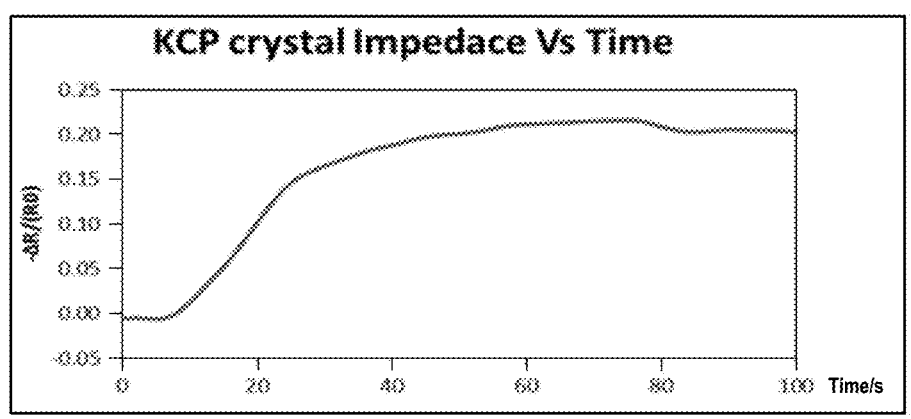
Figure 10C:
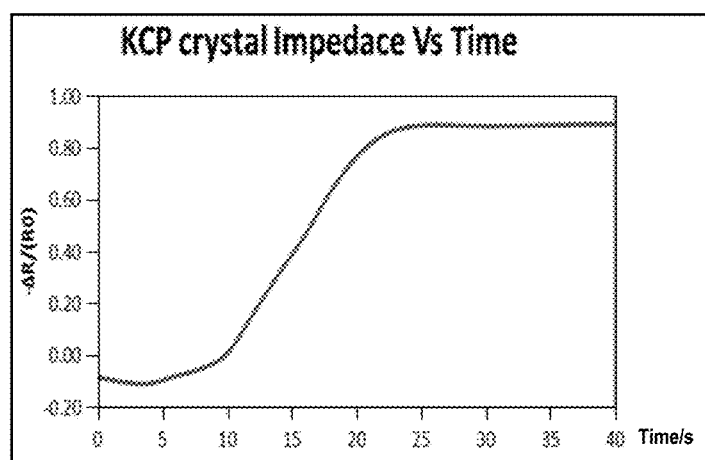
Figure 10D:
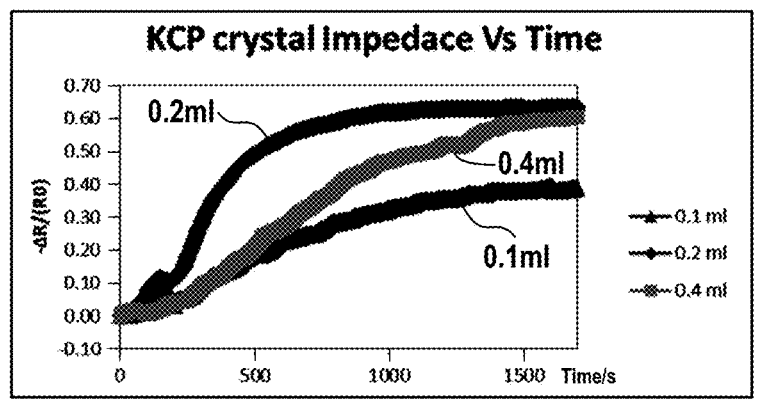

To design and fabricate micro-fabricated electrodes of Cr/Au, an example of such a pattern 400 is shown in FIG. 8A. The electrode 428 width (W) and separation distance (D) may be varied in order to control the number and length of the organic nanowires. Ideally one nanowire 430 will be grown from one electrode across the gap 431, due to the tapered shape 427 of the electrode, to the other as shown on all identical electrode pairs across a centimeter sized substrate with uniform length and width and we can vary the nanowire size by W and D. Interdigitated line patterns with varying line width (W) and separation distance (D) 455 as shown in FIG. 8B may also be used. The interdigitated lines may maximize the probability of nanowires making contacts on two opposing electrodes. Several blocks of patterns with varying D and W values can be made on the same substrate to allow the study of nanowire deposition as a function of pattern geometry (and subsequent platform for multifunctioning sensors). The line pattern can be further improved with tapered edges to ensure nanowire formation. Large contact pads at the substrate edge will allow easy access to electrical measurements. An actual fabricated microelectrode pattern 500 is shown in FIG. 8C. The parallel gold lines structure of FIG. 3b is a better approach due to increased contacts.

The seed-mediated concept is applicable to nanowires with diameters in the tens to hundreds of nanometers generated using microelectrode patterns. Nanodevices of this nature will also benefit from recent advances in lithographical and scanning beam patterning technology to produce patterns with sub-50 nm resolution. This technology enables the integration of bottom-up nanowire synthesis with existing lithographical methods.

The present disclosure describes nanowires formed by elecrocrystallization. The nanowires are electrical conductors and can therefore be used as sensors. This disclosure describes the deposition of such nanowires on lithographic patterns, graphite substrates, and printed conductive ink patterns. The present disclosure provides a sensor device with a nanowire as the sensing unit.

The nanowires of the present disclosure may be employed as electrochemical vapor nanosensors. When the nanowires deposited on the microelectrode are exposed to the vapor of solvents such as acetone, ammonia, hydrochloric acid, water, methanol, ethanol, isopropanol, and hydrogen sulfide, among others, electrochemical property change when exposed to analyte vapors can be measured using impedance spectroscopy. Impedance spectroscopy is a powerful method of analyzing the complex electrical resistance of a system and is sensitive to surface phenomena and changes of bulk properties. The advantages of impedance spectroscopy compared to other types of electrochemical measurements (voltammetry, amperometry, potiometry, and conductometry) are: 1) ability to make sensitive measurements because of steady response averaged over a long term, b) ability to treat the response theoretically by linearized current-potential characteristics, and c) measurements over a wide time or frequency range ($10^4$-$10^{-6}$ s or $10^{-4}$-$10^6$ Hz). The impedance, Z, is determined by applying a small voltage perturbation and detecting the current response, and is equal to the voltage-time function divided by the current-time function. The impedance value consists of a real in-phase part (resistance, R) and an imaginary out-of-phase part (capacitance, C) and can be analyzed by simple equivalent circuit analysis. Impedance spectroscopy measures impedance in a range of frequencies and can be used to obtain charge-transfer resistance and double-layer capacitance of the nanowires. We propose to investigate both R and C properties of the nanowires in the presence of vapors and identify the appropriate values and frequency range for sensitivity and selectivity optimization.

A gas/vapor chamber assembly can be employed for the nanowire sensor test. A design of such an apparatus 600 is shown in FIG. 9A. The system is made up of three parts: a gas line including gas tank 601 and MFC 604, a dilute line including a gas tank 602 and MFC 603, and a test chamber 606. The gas line including 601 and 604 can generate a target gas to be detected using a variety of gas generators 601 (see FIG. 9B). The target gas or vapor may be further diluted by introducing a carrier gas 602 from the dilute line incorporating 602 and 603 (see FIG. 9C) in order to test the efficacy of the sensor 607 at a lower level of target. The overall flow rate may be controlled by a mass flow controller (MFC) 603 and 604 in each of the lines, and the combined gas is introduced to the well-sealed chamber. In FIG. 9B, mixed gas 611 is provided in line with MFC 614, or a nitrogen/air mix 615 may be provided in line with a bubbler 616 before flowing into the MFC 613. Use of a syringe pump 617 to propel the gases is optional. Regarding FIG. 9C, embodiments of dilute lines are shown, in which a nitrogen/air mix 625 may flow through tube 627 to MFC 623, or nitrogen/air mix 635 may be diluted via bubbler 636 as gas is provided through two MFCs 638/639, before being combined and joined to the gas line.

In the embodiment of the testing system illustrated in FIGS. 9A-9C, the sensor is located inside the chamber, and data is collected and transferred to a computer via an inductance/capacitance/resistance (LCR) meter. Different target gases or vapors may be generated by different types of gas generators. Gases are introduced by using pre-mixed gas. Saturated vapor is generated by flowing through a bubbler, and low-concentration gases may be introduced via a syringe pump. A bubbler may also be used in the dilute line to vary the humidity.

Technical criteria such as those used to screen conducting polymers for chemosensitve properties, for the assessment of the nanowires as sensor materials may be employed. The criteria include: 1) absolute analytical sensitivity (change in signal value divided by change in analyte concentration), 2) relative analytical sensitivity (change in relative signal value divided by change in analyte concentration), 3) response rate (change of the signal during fixed time of the analyte addition), 4) recovery rate (if the recovery occurred because of analyte desorption at zero analyte concentration defined as signal changes during the fixed desorption time), 5) reversibility (ratio of the signal values before analyte adsorption and after recovery or for the recovery after the first and after the second analyte concentration pulses), 6) reproducibility (ratio of the signal changes for the first and second analyte addition), and 7) binding constant (for sensor materials which obey Langmuir adsorption isotherm) or response linearity (for sensor materials which obey Henry adsorption isotherm).

The impedance resistance change as a function of the nanowire exposure to various vapors has been studied. A laboratory chamber is purged with $N_2$ until the nanowire impedance reaches a constant value. R of the nanowires decreased after exposure to water, ethanol, and acetone vapors (FIGS. 10A-D). The mechanism of the impedance change has not been investigated. This may originate in a similar fashion as conducting polymers when exposed to analytes. Likely mechanisms for weakly adsorbed species such as ethanol and acetone in decreasing R of the nanowires include better ordering of the conducting chains, enhanced charge transfer, and increased charge mobility between adjacent chains. The nanowires can also be used to detect gases such as hydrogen sulfide and ammonia because the electron donor nature of these gases is likely to de-dope the organic nanowire crystals and lead to an increase in R. The response time in this study is impacted by the limitation of the current lab setup, which has an inherent time lag in introducing vapor. This lag time may be avoided by using the chamber described in FIG. 9. FIGS. 10A-D show the nanowire impedance change with the amount of acetone, which suggests that our nanowires can potentially display analytical sensitivity to analyte concentration change.

EXAMPLES $HAuCl_4 \cdot 3H_2O$ (>99.9%, Sigma-Aldrich), KCl (ACS grade, Fisher Scientific), and potassium tetracyanoplatinate (II) (Sigma-Aldrich) have been used as received. HOPG (ZYB grade, 1×1 cm$^2$), Pt wire for counter electrode was purchased from Alfa Aesar (0.25 mm, 99.9%), and Ag wire for quasi reference electrode was purchased from A-M Systems (0.25 mm).

PAP 263A potentiostat (Princeton Applied Research) was used in the electrochemical deposition employing a three electrode system. HOPG and AuNP-decorated HOPG was used as working electrode, a Pt wire was used as the counter electrode and an Ag wire was used as the quasi reference electrode. All the potentials reported herein are referenced to the SCE unless specified. The AuNPs were deposited by electrochemical reduction of hydrogen tetrachloroaurate ($HAuCl_4$) on the working electrode HOPG (see eqn. 1). The concentration of $HAuCl_4$ was varied from 0.05 to 10 mM with 0.1 mM KCl supporting electrolyte. Electrocrystallization of $K_{1.75}Pt(CN)_4 \cdot 1.5H_2O$ were conducted in 0.07-0.3 M $K_2Pt(CN)_4$ in deionized water. Chronoamperometry with a pulse of 1.5 V for 0.1-1 s was used on the HOPG with or without the AuNPs.

The nanocrystals were characterized with a Bruker Dimension 3100 AFM. Both tapping and contact modes were used. For the tapping mode silicon tips with a resonance frequency of 300 kHz were used. Al-coated silicon tips with a resonance frequency of 12 kHz were used. Both were from nanoScience instruments. The height, the amplitude, and phase images were recorded with a scan rate of 1 Hz. Size analysis of the nanoparticles was done with NanoScope software.

KPFM was conducted using Keysight 5500 AFM. The scan area was 20×20 µm$^2$. KPFM images were obtained after $N_2$ purging for 30 min, after filling the chamber with water vapor, and then again after $N_2$ purging.

The nanostructures deposited on the HOPG were characterized by FE SEM (JEOL JSM 7600F SEM). The acceleration voltage was 5 kV and 15 kV with a working distance of 8 mm and probe current of 6 µA. Observed images were analyzed with MeasureIT software (Olympus). The elemental composition data were obtained by in situ energy-dispersive spectroscopy (EDS) attached to the FE SEM and the EDAX Genesis v6.33 software were used to collect the data.

A standard lift-off photolithography method was used. A glass slide was cleaned stepwise with acetone, ethanol, and isopropanol inside a sonicator for 5 min each. After each step, the glass slide was rinsed with deionized water for 10 s and dried with $N_2$ flux. After the cleaning process, the glass slide was left on the hot plate at 120° C. for 10 min to remove water and then was placed on a hotplate at 110° C. for 50 s as a prebake step. AZ 5214E photo resist was spin-coated for 40 s at 5,000 rpm and was exposed to 50 mJ UV light while covered with a photo mask. The photoresist was developed for 60 s with 100% of AZ-327 developer and then rinsed for 30 s with deionized water. A 15 nm Cr layer was deposited prior to a 50 nm Au layer on the patterned glass slide with a thermal evaporator using a tungsten boat at 80 A current and 0.5 nm/s deposition rate. The precious metals are of 99.95% purity and were placed inside a molybdenum boat. The glass slide was placed 100 cm above the source for uniform deposition on surface. The metalized sample slide was immersed in acetone for 1 h to remove the remaining mask and the metal layer on top of the mask. The metalized layer directly deposited on the glass slide remains intact to give the desired pattern.

Impedance spectra were collected using an electrochemical impedance workstation (CH Instruments Electrochemical Workstation 600D) at 1 kHz and an oscillating voltage of 0.2 V in the three-electrode configuration. The patterned electrodes were cleaned with acetone, rinsed with water, and dried. The impedance was monitored as a function of time exposure to various vapors.

As a person skilled in the art will readily appreciate, the above description is meant as an illustration of implementation of the principles this application. This description is not intended to limit the scope of this application in that the system is susceptible to modification, variation and change, without departing from the spirit of this application, as defined in the following claims.

What is claimed is:

1. A sensor for detecting a chemical, the sensor comprising:
    an electrode; and
    at least one nanowire deposited directly on the electrode via electrochemical deposition, the at least one nanowire comprising an organic conductor or an organic semiconductor, and
    an electrode in connection with the at least one nanowire;
    wherein the at least one nanowire comprises potassium tetracyanoplatinate sesquihydrate.

2. The sensor of claim 1, wherein the chemical to be detected is a vapor or a gas.

3. The sensor of claim 2, wherein the vapor or gas is selected from ammonia, hexane, acetone, water, hydrochloric acid, methanol, ethanol, isopropanol, dichloromethane, and hydrogen sulfide.

4. The sensor of claim 1, wherein the electrode comprises at least one of gold, silver, copper, platinum, chromium and graphite.

5. A sensor array for detecting a chemical, the sensor array comprising a plurality of sensors, wherein each sensor of the plurality of sensors in the sensor array comprises:
    an electrode;

at least one nanowire directly deposited on the electrode via electrochemical deposition, the at least one nanowire comprising an organic conductor or an organic semiconductor, the organic conductor or organic semiconductor comprising potassium tetracyanoplatinate sesquihydrate; and an electrode in connection with the at least one nanowire;

wherein the sensor array is capable of detecting at least one chemical vapor or gas.

6. The sensor array of claim 5, wherein the electrode comprises at least one of gold, silver, platinum, copper, chromium, and graphite.

7. A method comprising:

applying a voltage to a solution comprising at least one of an organic conductor and an organic semiconductor comprising potassium tetracyanoplatinate sesquihydrate to yield at least one nanowire; and depositing the at least one nanowire directly on an electrode via electrochemical deposition.

8. The method of claim 7, wherein the method is carried out at room temperature.

9. The method of claim 7 comprising a one step, in situ synthesis process.

10. The method of claim 7, comprising etching an electrode pattern, the nanowire being formed over and in electrical connection with the pattern.

11. The method of claim 7, wherein the at least one nanowire comprises a tetracyanoplatinate.

12. The method of claim 7, wherein the electrode comprises at least one of gold, silver, copper, platinum, and chromium.

13. The sensor of claim 4, wherein the graphite is highly oriented pyrolytic graphite (HOPG).

14. The sensor of claim 1, wherein the electrode comprises an interdigitated pattern having multiple electrode lines in which the at least one nanowire makes contact with two of the multiple lines.

15. The sensor of claim 14, wherein the interdigitated pattern is a lithographic pattern or a printed conductive ink pattern.

16. The sensor array of claim 5, wherein the gas or vapor is selected from ammonia, hexane, acetone, water, hydrochloric acid, methanol, ethanol, isopropanol, dichloromethane, and hydrogen sulfide.

17. The sensor array of claim 5, wherein the electrode comprises an interdigitated pattern having multiple electrode lines in which the at least one nanowire makes contact with two of the multiple lines.

18. The sensor of claim 1, wherein the electrochemical deposition includes electrochemical crystallization.

* * * * *